United States Patent
Murakami et al.

(10) Patent No.: US 7,715,280 B2
(45) Date of Patent: May 11, 2010

(54) ELECTRONIC CLOCK

(75) Inventors: Akiyoshi Murakami, Ageo (JP);
Motoki Funahashi, Tokyo (JP);
Masahiko Hitomi, Higashimurayama (JP); Yoichi Nagata, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 943 days.

(21) Appl. No.: 10/528,145

(22) PCT Filed: Sep. 19, 2003

(86) PCT No.: PCT/JP03/12016

§ 371 (c)(1),
(2), (4) Date: Oct. 25, 2005

(87) PCT Pub. No.: WO2004/027525

PCT Pub. Date: Apr. 1, 2004

(65) Prior Publication Data

US 2006/0120221 A1 Jun. 8, 2006

(30) Foreign Application Priority Data

Sep. 19, 2002 (JP) .............................. 2002-272457

(51) Int. Cl.
G04C 3/00 (2006.01)
G04C 23/00 (2006.01)
(52) U.S. Cl. ............................ 368/64; 368/66; 368/204
(58) Field of Classification Search ......... 368/203–205, 368/64, 66
See application file for complete search history.

(56) References Cited

U.S. PATENT DOCUMENTS 4,785,435 A 11/1988 Inoue et al.
5,001,685 A * 3/1991 Hayakawa ................. 368/204
5,130,960 A * 7/1992 Hayakawa ................. 368/204
5,701,278 A * 12/1997 Higuchi et al. ............. 368/204
5,835,457 A * 11/1998 Nakajima ................... 368/204
5,889,734 A * 3/1999 Sato ............................ 368/64
6,301,198 B1 * 10/2001 Otaka et al. ................ 368/205
6,396,772 B1 * 5/2002 Yabe et al. .................. 368/204
6,462,967 B1 * 10/2002 Fujisawa et al. ............. 363/39
6,636,459 B1 * 10/2003 Nagata ....................... 368/204

(Continued)

FOREIGN PATENT DOCUMENTS

EP 1 113 347 A2 4/2001

(Continued)

*Primary Examiner*—Vit W Miska
(74) *Attorney, Agent, or Firm*—Finnegan, Henderson, Farabow, Garrett & Dunner, L.L.P.

(57) ABSTRACT

The invention provides a rechargeable electronic timepiece that restarts the operation of a clock circuit by inputting a power source, thereby securely confirming the clock operation. The electronic timepiece includes a first power source (2), a clock circuit (8) connected to the first power source, a power source input detecting circuit (86) for detecting an input of a second power source (3), a switch circuit (7, 9) for connecting the first power source and the second power source, and a control circuit (87) for controlling the switch circuit to connect the first power source and the second power source so that the first power source is charged by the second power source thereby operating the clock circuit when the power source input detecting circuit detects an input of the second power source.

19 Claims, 15 Drawing Sheets

U.S. PATENT DOCUMENTS

| | | | |
|---|---|---|---|
| 6,646,960 B1 * | 11/2003 | Nagata | 368/204 |
| 6,693,851 B1 * | 2/2004 | Fujisawa et al. | 368/203 |
| 6,956,794 B2 * | 10/2005 | Nakamura et al. | 368/203 |
| 7,161,874 B2 * | 1/2007 | Ichikawa et al. | 368/204 |

FOREIGN PATENT DOCUMENTS

| | | |
|---|---|---|
| JP | 55-105188 | 7/1980 |
| JP | 63-20097 | 2/1988 |
| JP | 63-21891 | 2/1988 |

* cited by examiner

ELECTRONIC CLOCK

BACKGROUND OF THE INVENTION

1. Field of the Invention

The present invention relates to an electronic timepiece having a control circuit for a power source switch. Particularly, the present invention relates to an electronic timepiece capable of quickly starting a clock circuit when power is supplied, during inspection, in the middle of an assembly process.

2. Description of the Related Art

An electronic timepiece, particularly a rechargeable electronic timepiece, can use a small-capacity capacitor and a large-capacity capacitor in some cases. In this case, the small-capacity capacitor is used to operate a clock circuit of the electronic timepiece until the large-capacity capacitor is charged to a level at which the large-capacity capacitor can normally operate the clock circuit of the electronic timepiece. When a voltage detecting circuit detects that the large-capacity capacitor is sufficiently charged, the power source, to supply power to the electronic timepiece is switched from the small-capacity capacitor to the large-capacity capacitor. When a voltage of the large-capacity capacitor drops, the power source for supplying power to the electronic timepiece is switched from the large-capacity capacitor to the small-capacity capacitor (refer to Japanese Patent Application Unexamined Publication No. 4-81754, FIG. 1 on page 5).

In general, this type of rechargeable electronic timepiece has a solar cell or the like as a power source, and charges the large-capacity capacitor and the small-capacity capacitor using this solar cell as the power source. However, during the assembly process in a plant or during the disassembly and cleaning at a retail shop, it is often necessary to confirm the operation of the clock circuit before the solar cell before the power source is built into or restored to the electronic timepiece. In this case, the large-capacity capacitor (usually a secondary cell) not connected to the solar cell is built into the electronic timepiece, thereby operating the clock circuit by using the power charged in this large-capacity capacitor.

A conventional technique is explained below with reference to FIG. 15. FIG. 15 is a block diagram of a conventional rechargeable electronic timepiece. In FIG. 15, a reference numeral 1 denotes power generating means, which is a solar cell according to the present conventional example. A reference numeral 2 denotes first storage means that stores energy of the power generating means 1, and operates a clock circuit. A capacitor is used for the first storage means, according to the present conventional example. A reference numeral 3 denotes second storage means that stores energy of the first power generating means 1, and discharges energy to the first storage means 2 when the power generating means 1 is not generating power. A secondary cell is used for the second storage means, according to the present conventional example. In general, a cell having a smaller capacity than that of the secondary cell 3 is used for the capacitor 2.

Reference numerals 4 and 5 denote backflow preventing diodes that prevent a backflow of the energy stored in the first storage means 2 and the second storage means 3 to the power generating means 1, when the power generating means 1 is not generating power, or when the power generating means 1 is not generating electromotive force. A reference numeral 6 denotes a switch for turning on so as to charge power generation energy of the power generating means 1 to the second storage means 3. This switch 6 consists of an N-channel transistor 61, according to the present conventional example.

A reference numeral 7 denotes a switch to connect the first storage means 2 and the second storage means 3, in parallel, when the second storage means 3 is sufficiently charged. According to the present conventional example, the switch 7 consists of a backward N-channel transistor 71 and a forward N-channel transistor 72.

A reference numeral 8 denotes a clock circuit. The clock circuit 8 includes: an oscillating circuit 81; an oscillation halt detecting circuit 82 that detects whether the oscillating circuit 81 is oscillating; a frequency-dividing circuit 83 that divides a frequency of a signal of the oscillating circuit 81; a waveform shaping circuit 84 that generates a desired signal using a signal of the frequency-dividing circuit 83; and a cell voltage detecting circuit 85 that detects a voltage of the second storage means 3. The clock circuit 8 also includes a digital frequency controlling circuit and a motor driving circuit, which are omitted from the present explanation.

The operation of the conventional rechargeable electronic timepiece shown in the block diagram in FIG. 15 is explained next. When the second storage means 3 is not sufficiently charged, the cell voltage detecting circuit 85 detects that the voltage of the second storage means 3 is low, and turns off the switch 7. The waveform shaping circuit 84 controls the switch 6 to be repeatedly turned on and off every second. While the switch 6 is off, the power generation energy of the power generating means 1 is charged to the first storage means 2. While the switch 6 is on, the power generation energy of the power generating means 1 is charged to the second storage means 3.

When the voltage of the second storage means 3 rises after the second storage means is charged by the power generating means 1 when the second storage means 3 is not sufficiently charged, the cell voltage detecting circuit 85 detects the rise of the voltage of the second storage means 3, and turns on the switch 7. As a result, the first storage means 2 and the second storage means 3 are connected in parallel. Therefore, the power generating means 1 simultaneously charges the first storage means 2 and the second storage means 3, regardless of whether the switch 6 is on or off. In the state that the first storage means 2 and the second storage means 3 are connected in parallel, the second storage means 3 replenishes energy to the first storage means 2 even when the power generating means 1 does not generate power. Therefore, the clock circuit 8 can continue in operation.

When a state that the power generating means 1 does not generate power continues, the energy stored in the second storage means 3 decreases. Then, the cell voltage detecting circuit 85 detects a reduction in the voltage of the second storage means 3, and turns off the switch 7. As a result, the power source of the clock circuit 8 is switched to the first storage means 2. When the state that the power generating means 1 does not generate power further continues, the energy stored in the first storage means 2 is consumed, which lowers the voltage, and halts the operation of the oscillating circuit 81. At the same time, the waveform shaping circuit 84 halts the operation, and the switch 6 is turned off.

When the state that the power generating means 1 does not generate power further continues, the energy stored in the first storage means 2 further decreases due to a leakage inside the clock circuit 8 or the like, and the voltage of the first storage means 2 comes close to 0 volt (GND). Then, there is a risk that a potential of an L level, that the waveform shaping circuit 84 and the cell voltage detecting circuit 85 are outputting to turn off the switch 6 and the switch 7, is recognized as an H level, and the switch 6 and the switch 7 are turned on. In order to avoid this risk, the waveform shaping circuit 84 and the cell voltage detecting circuit 85 are configured to output the L level of a bulk potential of respective N-channel transistors, thereby turning off the switches, while the oscillation halt detecting circuit 82 is detecting the oscillation halt.

As explained above, when the clock circuit 8 has halted the operation, the switch 7 is in the off state, and the power source of the clock circuit is set to the first storage means 2. Therefore, the clock circuit 8 starts operating again when energy is stored in the first storage means 2, that is, when the power generating means 1 starts power generation. Because the switch 6 and the switch 7 are in the off state, when the power generating means 1 starts generating power, the power energy generated by the power generating means 1 is stored into the first storage means 2. When the voltage of the first storage means 2 exceeds the operating voltage of the oscillating circuit 81, the oscillating circuit 81 starts operating, and the switch 6 and the switch 7 can be controlled.

The above explains the operations of the power generating means 1 and the first and the second storage means 2 and 3, in the state that the power generating means (i.e., the solar cell) 1 is connected to the circuit. However, as explained above, it is often necessary to confirm the operation of the clock circuit before the power generating means 1 is connected to the first storage means 2 or the second storage means 3 in the middle of the assembly process in the plant.

In this case, at the beginning, the second storage means 3 that is charged to some extent beforehand is put into the electronic timepiece (i.e., connected to or built in the circuit of the electronic timepiece). Before the power generating means 1 is connected to the circuit, the clock circuit 8 is in a non-driven state as a matter of course. When the second storage means 3 is input to the electronic timepiece, it becomes possible to charge the first storage means 2. However, because the clock circuit 8 is not operating, the cell voltage detecting circuit 85 is in the non-driven state. Therefore, the first storage means 2 as the power source of the clock circuit 8 is separated from the second storage means 3. To overcome this difficulty, both sides of the switch 7 are connected with a conductive pin to compulsively charge the first storage means 2, thereby driving the clock circuit 8. As an alternative method, it is necessary to take the trouble of connecting the power generating means (i.e., the solar cell) 1 to the circuit to secure a power source, thereby driving the clock circuit 8. According to the above method, when the voltage of the first storage means 2 becomes equal to or higher than a constant voltage, the clock circuit 8 starts operating. Thereafter, the operation of the clock circuit is confirmed. For example, the power consumption is checked.

As described above, the conventional chargeable electronic timepiece has the following problems.

When the cell voltage of the first storage means 2 is insufficient, the first storage means 2 must be charged to operate the clock circuit 8. For example, in order to confirm whether the clock circuit 8 operates in the middle of the assembly process of the production line in the plant, it is necessary to (1) compulsively charge the first storage means 2 by putting the second storage means 3 into the electronic timepiece, or (2) charge the first storage means 2 by connecting the power generating unit (i.e., the solar cell) 1 to the circuit.

Particularly at the time of measuring power consumption of the clock circuit 8 in the production line, an ammeter is usually connected to a terminal of the second storage means 3. However, the clock circuit 8 does not operate until when the first storage means 2 as the power source of the clock circuit 8 is charged. Therefore, it is necessary to take the trouble to compulsively charge the first storage means 2. To take time in charging the first storage means 2 in this way is very troublesome. This point similarly applies to the disassembly and repair of the electronic timepiece.

SUMMARY OF THE INVENTION

It is an object of the present invention to provide a (rechargeable) electronic timepiece that can solve the above problems, can securely start operating a clock system by simply putting a secondary cell into the electronic timepiece, and can confirm the operation of a clock circuit, such as measuring power consumption, in a short time.

In order to achieve the above object, the present invention provides an electronic timepiece including a first power source, a clock circuit connected to the first power source, a power source input detecting circuit for detecting an input of a second power source, a switch circuit for connecting the first power source and the second power source, and a control circuit for controlling the switch circuit to connect the first power source and the second power source so that the first power source is charged by the second power source thereby operating the clock circuit when the power source input detecting circuit detects an input of the second power source. Because the electronic timepiece is configured to turn on the switch by detecting the input of the second power source, thereby supplying power to the clock circuit, the electronic timepiece can operate the clock circuit in a halted state even if the power generating means generates power. Further, because the electronic timepiece is configured to turn on the switch by detecting the input of the second power source, thereby supplying power to the clock circuit, the electronic timepiece can operate the clock circuit in a halted state even if the first power source has no stored energy.

In the electronic timepiece according to the present invention, it is preferable that the second power source has a capacity larger than that of the first power source.

In the electronic timepiece according to the present invention, it is preferable that the switch circuit has a first switch that connects the first power source and the second power source in parallel, and a second switch that is connected in parallel to the first switch, and that when the power source input detecting circuit detects the input of the second power source, the control circuit turns on the second switch to connect the first power source and the second power source.

It is preferable that the electronic timepiece according to the present invention further includes a power generator and voltage detector for turning on the first switch when the power generator sufficiently charges the second power source.

In the electronic timepiece according to the present invention, it is preferable that the control circuit is controlled by the clock circuit.

In the electronic timepiece according to the present invention, it is preferable that the control circuit is controlled by the clock circuit to turn off the second switch when the oscillating circuit starts oscillating after the second switch is turned on. Because the electronic timepiece is configured such that the switch is turned off after the oscillating circuit starts oscillating, the electronic timepiece can carry out the normal operation after the switch is turned off.

In the electronic timepiece according to the present invention, it is preferable that the control circuit turns off the second switch after a lapse of a predetermined time after the second switch is turned on. Because the electronic timepiece is configured such that the switch is turned off after a lapse of sufficient time after the oscillating circuit starts oscillating, the clock circuit can be securely operated after the power source is input.

In the electronic timepiece according to the present invention, it is preferable that the control circuit includes clocking means, and that when the clocking means runs for a predetermined time, the control circuit turns off the second switch. Because the electronic timepiece is configured such that the switch is turned off after a lapse of sufficient time, the clock circuit can be operated securely.

In the electronic timepiece according to the present invention, it is preferable that the control circuit is controlled by the clock circuit to turn off the second switch after a lapse of a predetermined time after the oscillating circuit starts oscillating after the second switch is turned on. Because the electronic timepiece is configured such that the switch is turned off after a lapse of sufficient time after the oscillating circuit starts oscillating, the clock circuit can be securely operated after the power source is input.

In the electronic timepiece according to the present invention, it is preferable that the control circuit controls to turn off the second switch when it is detected that the power generator generates power after the second switch is turned on. Because the electronic timepiece is configured such that the switch remains in the off state when the power generator is generating power, the electronic timepiece can quickly starts running after the power generation is started.

It is preferable that the electronic timepiece according to the present invention further includes a comparator circuit that operates so as not to turn on the second switch when the voltage of the second power source is at or below a predetermined voltage. Because the electronic timepiece is configured such that the switch is not turned on when the power source voltage is insufficient for the oscillating circuit to oscillate, the electronic timepiece can quickly starts running after the power generation is started.

In the electronic timepiece according to the present invention, it is preferable that the switch circuit has a first switch that connects the first power source in parallel to the second power source and that, when the power source input detecting circuit detects that the second power source is input, the control circuit turns on the first switch to connect the first power source and the second power source. The electronic timepiece is configured to supply power to the clock circuit by detecting that the second power source is input, without providing the second switch in parallel to the first switch.

DETAILED DESCRIPTIONS

Rechargeable electronic timepiece according to embodiments of the present invention are explained in detail below.

Figure 1:
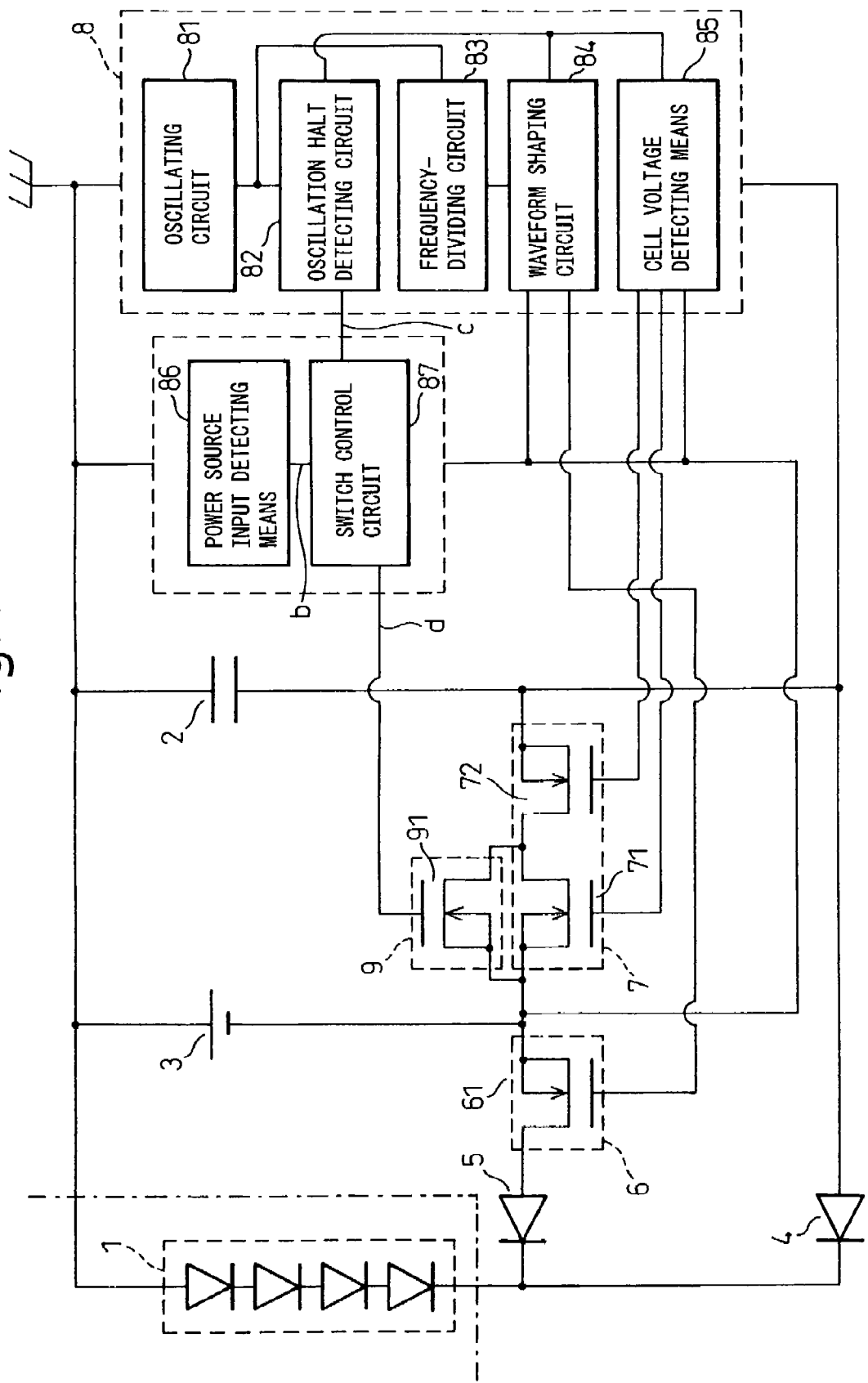
FIG. 1 is a block configuration diagram of a rechargeable electronic timepiece according to a first embodiment of the present invention.
Figure 15:
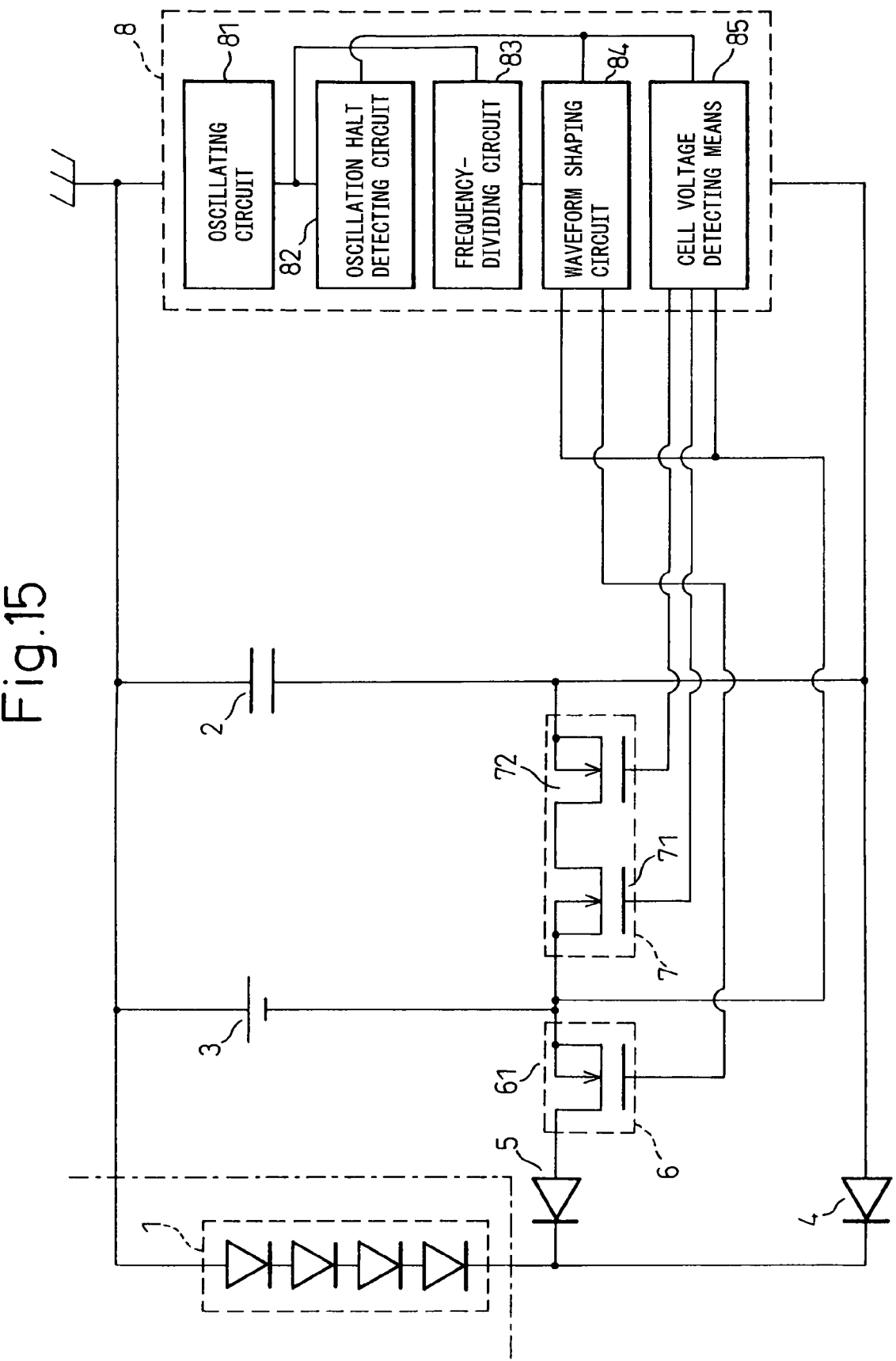
FIG. 15 is a configuration diagram of a rechargeable electronic timepiece showing a conventional technique.

FIG. 1 is a block diagram of a rechargeable electronic timepiece according to a first embodiment of the present invention. In FIG. 1, constituent elements similar to those shown in FIG. 15 are assigned with identical reference numerals, and their explanation is omitted.

In FIG. 1, a reference numeral 86 denotes power source input detecting means that detects that the second storage means 3 is input to the electronic timepiece, and 87 denotes a switch control circuit that controls a switch 9 described later. The second storage means 3 supplies power to the power source input detecting means 86 and the switch control circuit 87. The switch 9 consists of a backward N-channel transistor 91, and is connected in parallel to an N-channel transistor 71 that constitutes a switch 7.

Figure 9:
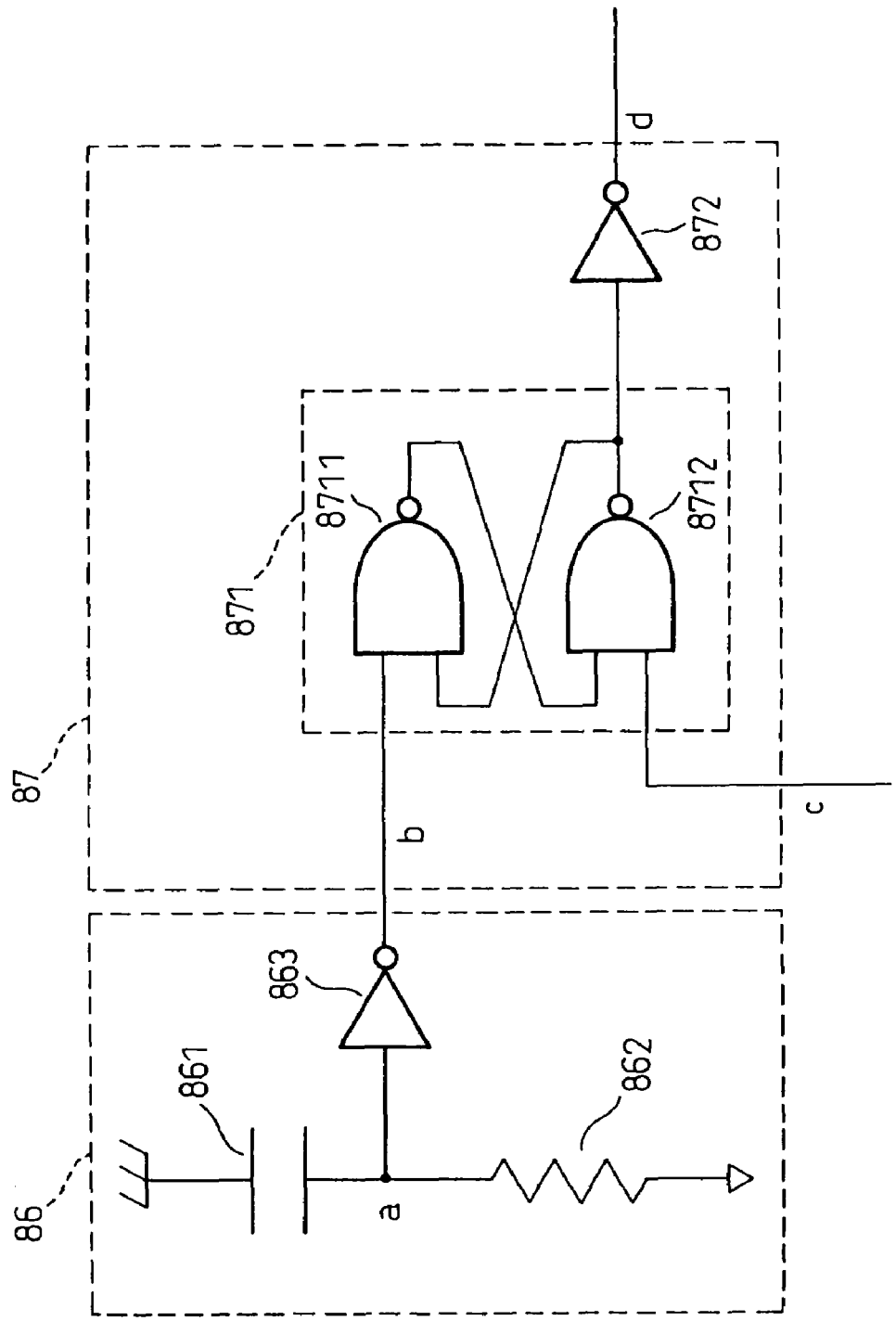
FIG. 9 is a configuration diagram of power source input detecting means and a switch control circuit according to the present invention.

FIG. 9 shows one example of a circuit configuration of the power source input detecting means 86 and the switch control circuit 87. The power source input detecting means 86 includes a capacitor 861, a resistor 862, and an inverter 863. One electrode of the capacitor 861 is set to a VDD potential, and the other electrode of the capacitor 861 is connected to the resistor 862. One terminal of the resistor 862 is set to a VSS potential, and the other terminal of the resistor 862 is set to the capacitor 861. A line that connects between the capacitor 861 and the resistor 862 is connected to an input (a signal (a)) of the inverter 863, and an output of the inverter 863 becomes an output (a signal (b)) of the power source input detecting means 86.

The switch control circuit 87 includes a NAND latch 871 having NAND gates 8711 and 8712, and an inverter 872. An input of the NAND gate 8711 of the NAND latch 871 is connected to the output (the signal (b)) of the power source input detecting means 86. An input of the other NAND gate 8712 is connected to an output (a signal (c)) of the oscillation halt detecting circuit 82 according to the embodiment shown in FIG. 1. An output of the NAND gate 8712 is connected to an input of the inverter 872, and an output of the inverter 872 becomes an output (a signal (d)) of the switch control circuit 87.

Figure 10:
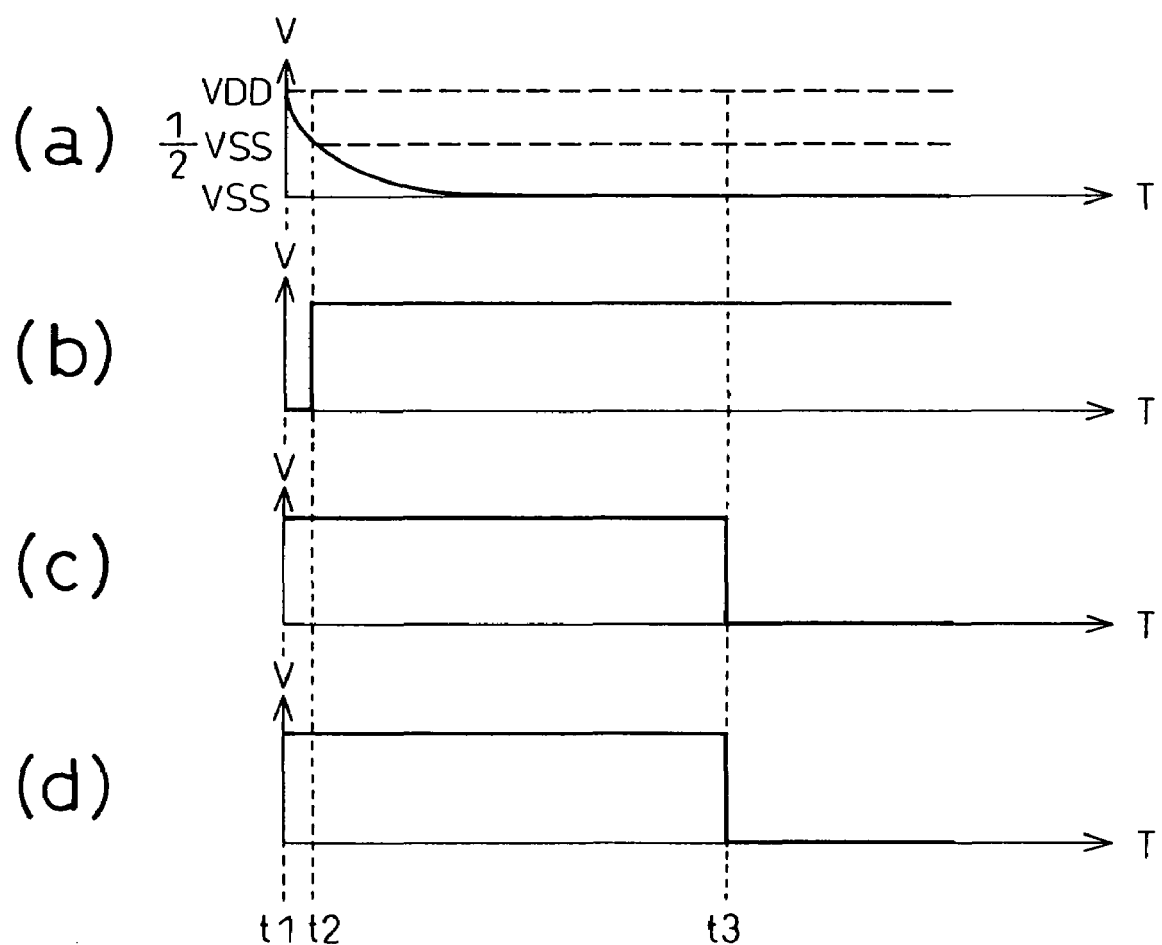
FIG. 10 is a time chart of the operation of the power source input detecting means and the switch control circuit according to the present invention.

The operation of the circuit shown in FIG. 9 is explained with reference to a time chart shown in FIG. 10. In FIG. 10, (a) to (d) show the signals (a) to (d) respectively. A time t1 represents a time when a power source is input to the power source input detecting means 86, and also a time when the second storage means 3 is connected to the rechargeable clock. When the VSS potential is supplied to the power source input detecting means 86, the capacitor 861 is charged to the VSS potential based on a predetermined time according to the capacity of the capacitor 861 and the resistance of the resistor 862. Therefore, the potential of the signal (a) shown in FIG. 9 shifts to a level as shown in (a) in FIG. 10. When the potential of the input is higher than ½ VSS, the inverter 863 outputs an L level signal, and when the input is lower than ½ VSS, the inverter 863 outputs an H level signal.

A time t2 represents a time when the potential of the signal (a) becomes ½ VSS. When the capacitor 861 is charged and also when the potential of the capacitor 861 becomes lower than ½ VSS (at time t2), the output (the signal (b)) of the inverter 863 is switched from the L level to the H level (refer to (b) in FIG. 10). As explained above, the power source input detecting means 86 outputs the L level signal only at the beginning when the second storage means 3 is input. When the second storage means 3 remains in the input state, the power source input detecting means 86 does not output the L level signal thereafter.

When an oscillation halt of the oscillating circuit 81 is detected, the output (the signal (c)) of the oscillation halt detecting circuit 82 becomes the H level. Therefore, when the second storage means 3 is input, the input (the signal (c)) of the NAND gate 8712 of the switch control circuit 87 becomes the H level (refer to (c) in FIG. 10). When the second storage means 3 is input, the signal (b) is at the L level. Therefore, the input (the signal (b)) of the NAND gate 8711 is at the L level, and accordingly, the output of the NAND gate 8711 becomes the H level. Because both inputs are at the H level, the output of the NAND gate 8712 becomes the L level. At time t2, the NAND gate 8712 inputs the L level signal, and the output (the signal (d)) of the inverter 872 becomes the H level (refer to (d)) in FIG. 10).

A time t3 represents a time when the oscillation halt detecting circuit 82 detects the oscillation of the oscillating circuit 81. When the oscillation of the oscillating circuit 81 is detected, the output (the signal (c)) of the oscillation halt detecting circuit 82 becomes the L level. At time t3, when the input (c) of the NAND gate 8712 becomes the L level, the output of the NAND gate 8712 becomes the H level. At time t3, the NAND gate 8712 inputs the H level signal, and the output (the signal (d)) of the inverter 872 becomes the L level (refer to (d)) in FIG. 10). As explained above, the switch control circuit 87 outputs the H level signal after the second storage means 3 is input, based on the output (the signal (c)) of the power source input detecting circuit 86, and thereafter output the L level signal. When the second storage means 3 remains in the input state, the switch control circuit 87 does not operate thereafter.

The operation of the circuit shown in FIG. 1 is explained next.

As described above, the power consumption of the clock circuit 8 may be tested in the middle of the assembly process in the plant. At the beginning, the power generating means (i.e., the solar cell) 1 is not connected to the circuit, and that the second storage means (i.e., the secondary cell) 3 is not input to the electronic timepiece.

First, the second storage means 3 which is charged to some extent is input.

Immediately before the second storage means 3 is input, the clock circuit 8 is in the non-operating state. Because the oscillation halt detecting circuit 82 is detecting the oscillation halt of the oscillating circuit 81, the signal (c) is at the H level. Because the oscillating circuit is in the oscillation halt state, the waveform shaping circuit 84 and the cell voltage detecting means 85 output the L level signals respectively.

Figure 14:
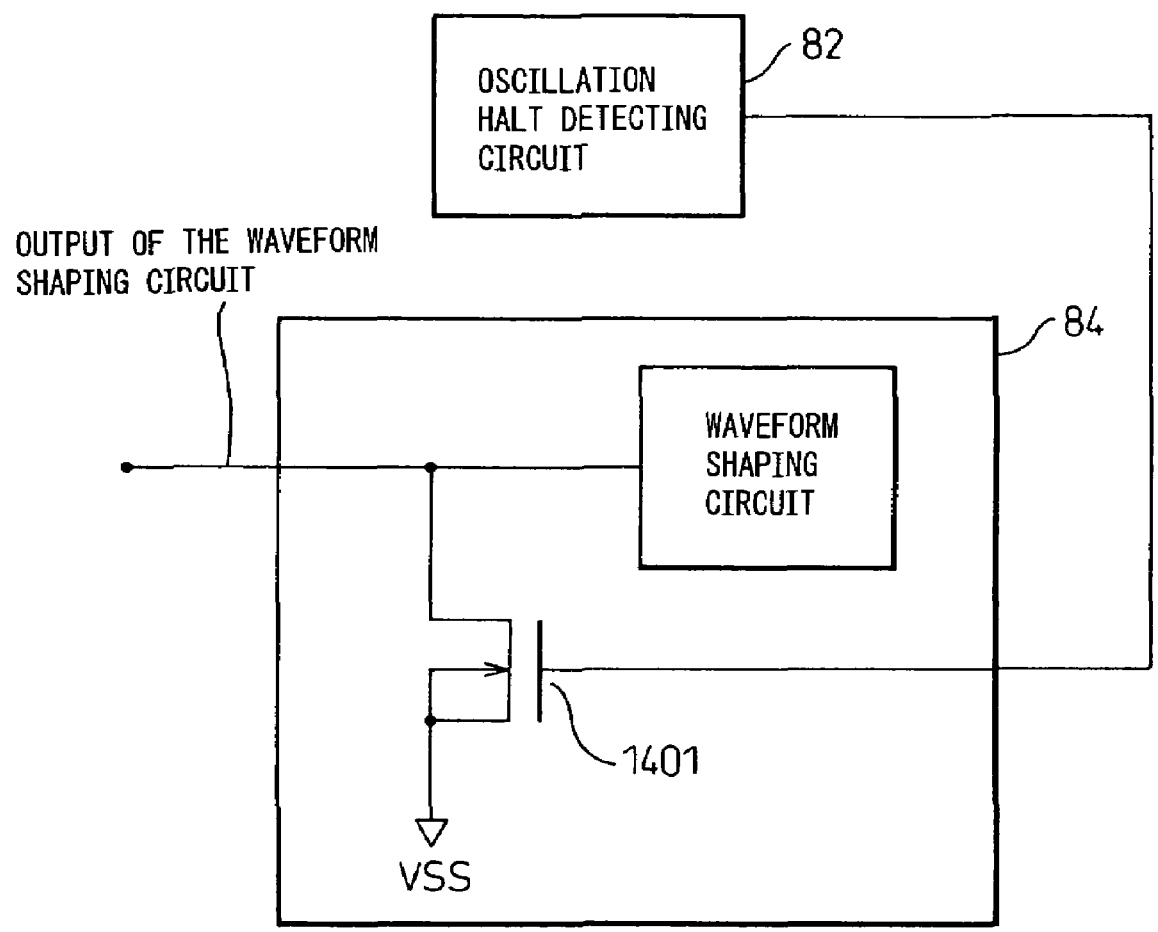
FIG. 14 is a diagram showing a relationship between an oscillation halt detecting circuit 82 and a waveform shaping circuit 84.

FIG. 14 is a diagram showing a relationship between the oscillation halt detecting circuit 82 and the waveform shaping circuit 84. In FIG. 14, a drain of an N-channel transistor 1401 is connected to each final output of the waveform shaping circuit 84. A source bulk of the N-channel transistor 1401 is connected to VSS, and a gate of this transistor is connected to the oscillation halt detecting circuit 82. Upon detecting the oscillation halt, the oscillation halt detecting circuit 82 supplies the H level signal to the gate of the N-channel transistor 1401. As a result, the N-channel transistor 1401 is turned on, and each output becomes the VSS level. In other words, in the oscillation halt state, the waveform shaping circuit 84 and the cell voltage detecting means 85 output the L level (i.e., the VSS level) signals. When the oscillating circuit 81 is oscillating, the oscillation halt detecting circuit 82 outputs the L level signal, and the N-channel transistor 1401 is in the off state. Therefore, the N-channel transistor 1401 does not affect the circuit operation. Consequently, the switch 6 and the switch 7 become in the off state. Because the switch control circuit 87 is outputting the L level signal at times other than when the second storage means 3 is input, as described above, the switch 9 is also in the off state. The first storage means 2 as the power source of the clock circuit 8 is also in the state of having no stored energy. Based on the above, immediately before the second storage means 3 is input, the clock circuit 8 is in the non-operating state, and the switch 6, the switch 7, and the switch 9 are in the off state respectively.

When the second storage means 3 is input in this state, when detecting that the second storage means 3 is input, the power source input detecting means 86 outputs the L level signal (i.e., the signal (b)), as described above. When the signal (b) becomes the L level, the switch control circuit 87 outputs the H level signal (i.e., the signal (d)). As a result, the switch 9 is turned on. When the connected second storage means 3 is sufficiently charged and has sufficient voltage in advance, the energy stored in the second storage means 3 is charged to the first storage means 2 via the switch 9 in the on state and a parasitic diode of the forward N-channel transistor 72 of the switch 7. The voltage of the first storage means 2 rises due to the charging, and exceeds a minimum operating voltage of the oscillating circuit 81. Then, the oscillating circuit 81 starts oscillating, and the clock circuit 8 starts operating.

As described above, when the oscillation halt detecting circuit 82 detects that the oscillating circuit 81 starts oscillation, the oscillation halt detecting circuit 82 outputs the L level signal (i.e., the signal (c)). When the signal (c) becomes the L level, the switch control circuit 87 outputs the L level signal (i.e., the signal (d)). As a result, the switch 9 is turned off. At the same time, when detecting that the second storage means 3 has sufficient voltage, the cell voltage detecting means 85 outputs the H level signal, and turns on the switch 7. As explained above, when the second storage means 3 is input in the state that the operation of the clock circuit 8 is halted, the clock circuit 8 can quickly start operation. Therefore, the power consumption of the clock circuit 8 can be tested easily. Needless to mention, the present system can be also employed at the time of disassembling the clock at a retail shop or the like.

Figure 2:
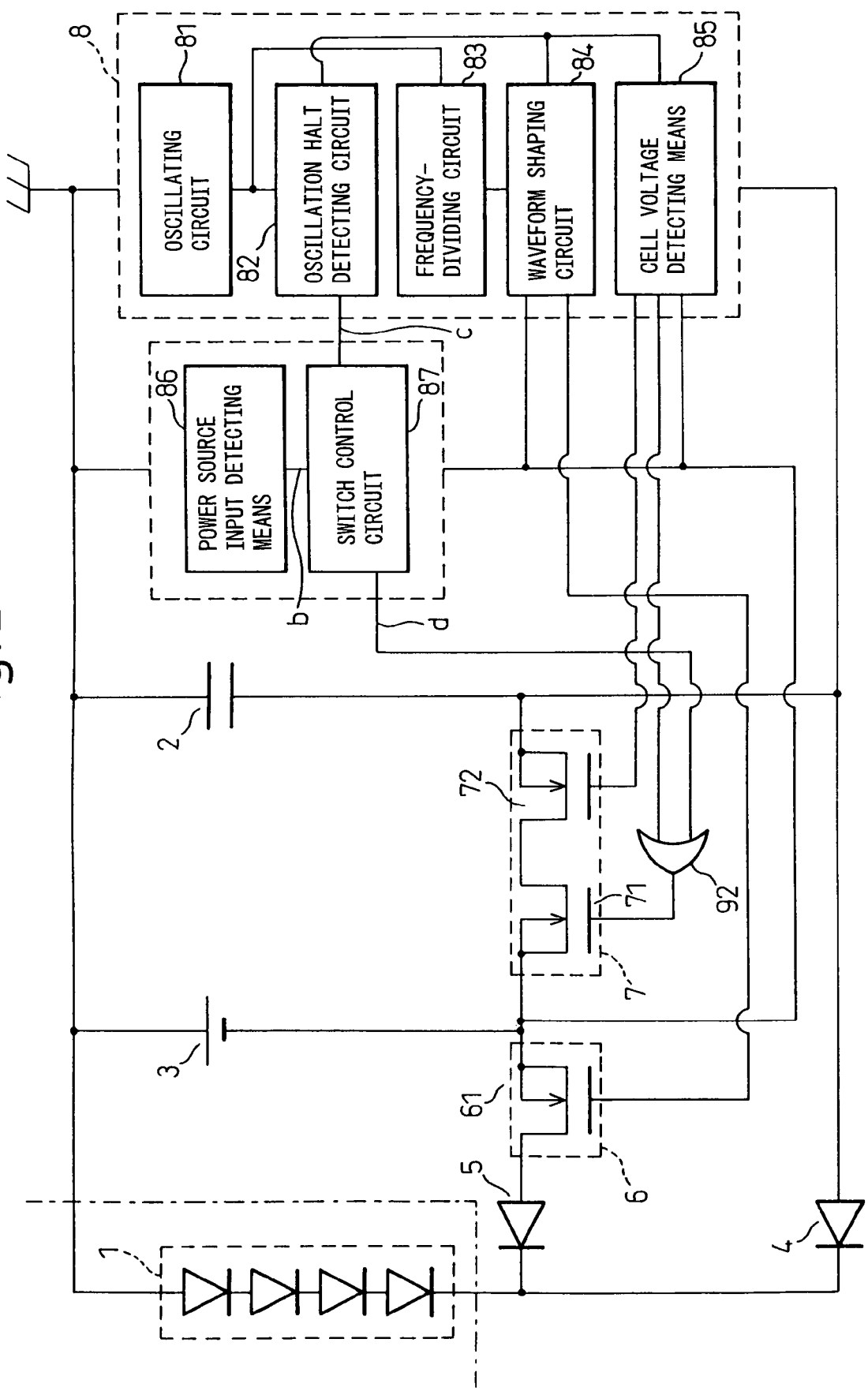
FIG. 2 is a block configuration diagram showing a modification of the rechargeable electronic timepiece according to the first embodiment.

FIG. 2 is a block configuration diagram showing a modification of the rechargeable electronic timepiece according to the first embodiment. The rechargeable electronic timepiece shown in FIG. 2 is different from that shown in FIG. 1 in that an OR circuit 92 is provided in place of the switch 9 shown in FIG. 1. One input of the OR circuit 92 is connected to the switch control circuit 87, and the other input of the OR circuit 92 is connected to the cell voltage detecting means 85. An output of the OR circuit 92 is connected to the gate of the N-channel transistor 71 of the switch 7.

In FIG. 2, as in the first embodiment, when detecting that the second storage means 3 is input, the power source input detecting circuit 86 outputs the L level signal (i.e., the signal (b)). When the signal (b) becomes the L level, the switch control circuit 87 outputs the H level signal (i.e., the signal (d)). As a result, the OR circuit 92 outputs the H level signal, and the N-channel transistor 71 of the switch 7 is turned on. Then, the energy stored in the second storage means 3 is discharged to the first storage means 2 via the N-channel transistor 71 of the switch 7 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating. Thereafter, when detecting that the oscillating circuit 81 starts oscillation, the oscillation halt detecting circuit 82 outputs the L level signal (i.e., the signal (c)), as in the first embodiment. When the signal (c) becomes the L level, the switch control circuit 87 outputs the L level signal (i.e., the signal (d)). However, when it detects that the second storage means 3 has a sufficient voltage, the cell voltage detecting means 85 outputs the H level signal. Therefore, the OR circuit 92 outputs the H level signal, and continues to keep the switch 7 on. As explained above, when the second storage means 3 is input in the state that the operation of the clock circuit 8 is halted, the clock circuit 8 can quickly start operation. As described above, when the OR circuit 92 is provided in place of the switch 9 shown in FIG. 1, the rechargeable electronic timepiece can operate in a similar manner to that of the rechargeable electronic timepiece shown in FIG. 1. Needless to mention, the present modified system can be also employed at the time of disassembling the clock at a retail shop or the like.

Figure 3:
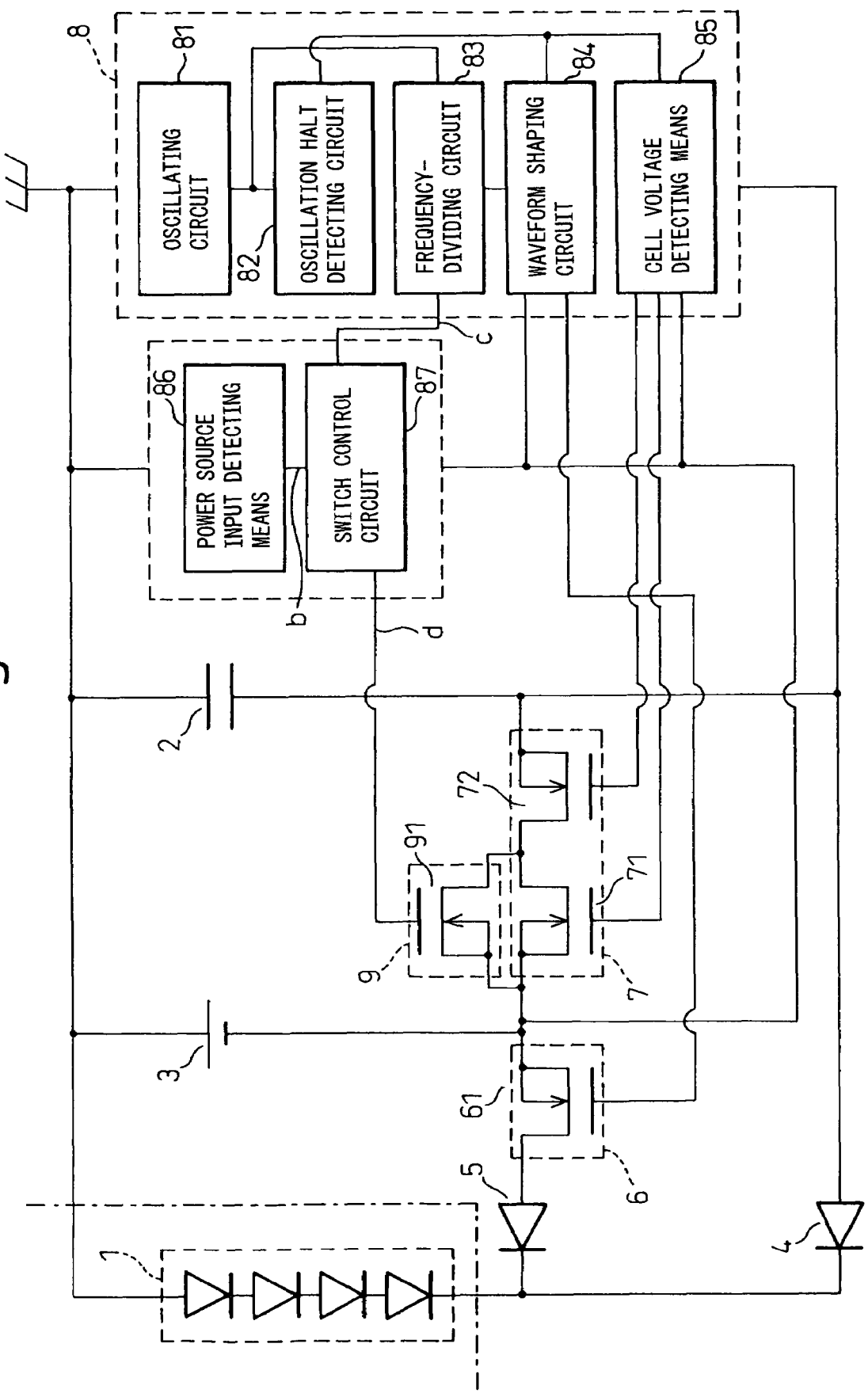
FIG. 3 is a block configuration diagram of a rechargeable electronic timepiece according to a second embodiment of the present invention.

FIG. 3 is a block configuration diagram of a rechargeable electronic timepiece according to a second embodiment of the present invention. The rechargeable electronic timepiece shown in FIG. 3 is different from that shown in FIG. 1 in that the switch control circuit 87 shown in FIG. 3 is controlled based on a signal of the frequency-dividing circuit 83.

According to the present embodiment, as in the first embodiment, it is assumed that, at the beginning, the power generating means 1 is not connected to the circuit, and that the second storage means 3 is not input to the electronic timepiece. Therefore, the second storage means 3 is input first.

When it detects that the second storage means 3 is input, the power source input detecting circuit 86 outputs the L level signal (i.e., the signal (b)). When the signal (b) becomes the L level, the switch control circuit 87 turns on the switch 9. The energy stored in the second storage means 3 is discharged to the first storage means 2 via the N-channel transistor 91 of the switch 9 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating.

The frequency-dividing circuit 83 divides the frequency of the signal output from the oscillating circuit 81, and outputs the L level signal (i.e., the signal (c)) after a lapse of sufficient time. When the signal (c) becomes the L level, the switch control circuit 87 outputs the L level signal (i.e., the signal (d)). As a result, the switch 9 is turned off. Because the switch 9 is turned off after the oscillation of the oscillating circuit 81 is stabilized as described above, the clock circuit 8 can operate more securely. In other words, even when the oscillating circuit 81 stops oscillation immediately after starting oscillation, the switch 9 is not immediately turned off. Therefore, the first storage means 2 is charged continuously. Consequently, the oscillating circuit 81 is urged to start oscillating again, thereby achieving the operation of the clock circuit more securely.

Figure 4:
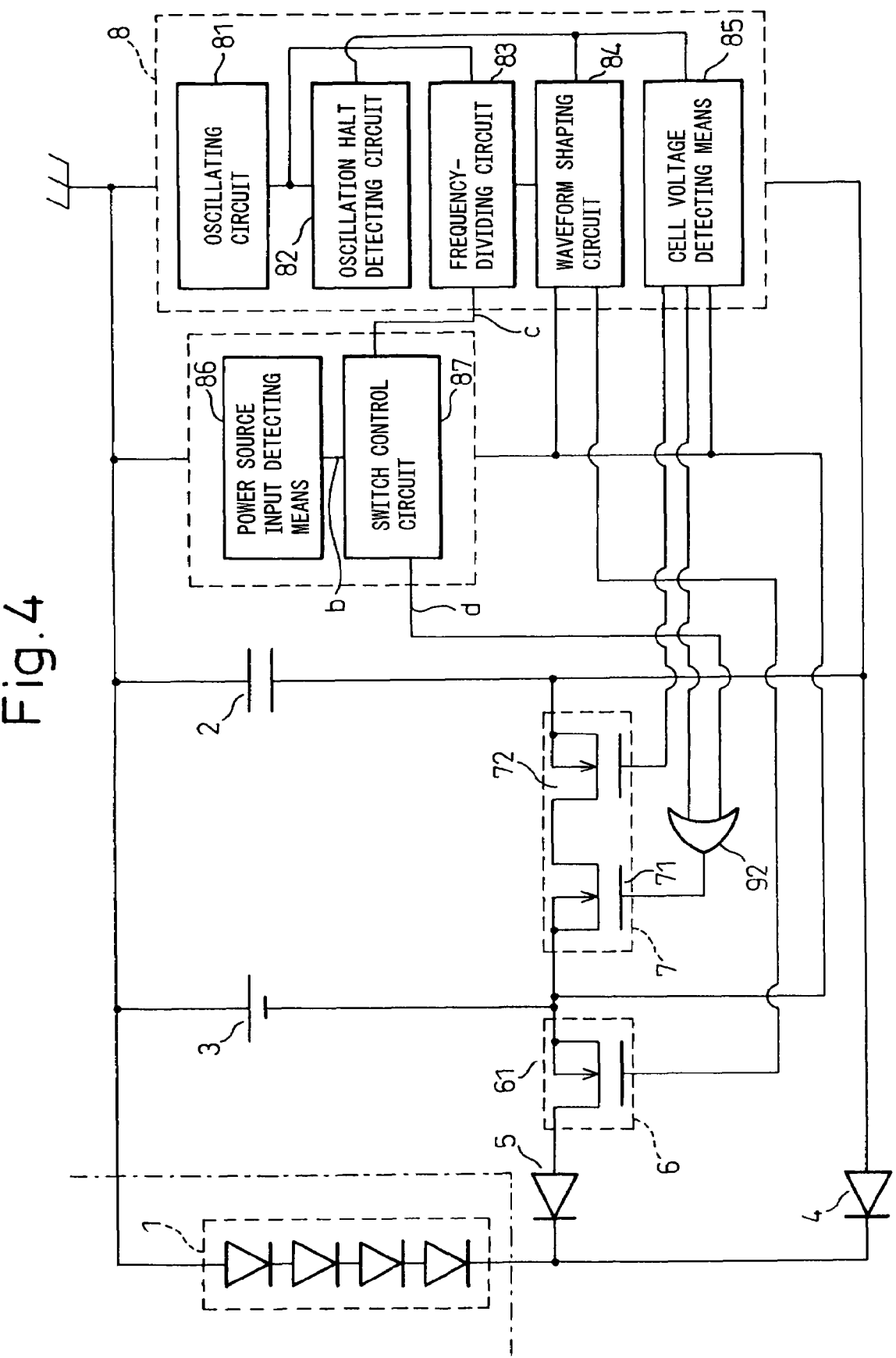
FIG. 4 is a block configuration diagram showing a modification of the rechargeable electronic timepiece according to the second embodiment.

FIG. 4 is a block configuration diagram showing a modification of the rechargeable electronic timepiece according to the second embodiment. The rechargeable electronic timepiece shown in FIG. 4 is different from that shown in FIG. 3 in that the OR circuit 92 is provided in place of the switch 9 shown in FIG. 3. One input of the OR circuit 92 is connected to the switch control circuit 87, and the other input of the OR circuit 92 is connected to the cell voltage detecting means 85. The output of the OR circuit 92 is connected to the gate of the N-channel transistor 71 of the switch 7.

In FIG. 4, as in the second embodiment, when detecting that the second storage means 3 is input, the power source input detecting circuit 86 outputs the L level signal (i.e., the signal (b)). When the signal (b) becomes the L level, the switch control circuit 87 outputs the H level signal (i.e., the signal (d)). As a result, the OR circuit 92 outputs the H level signal, and the N-channel transistor 71 of the switch 7 is turned on. Then, the energy stored in the second storage means 3 is discharged to the first storage means 2 via the N-channel transistor 71 of the switch 7 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating.

The frequency-dividing circuit 83 divides the frequency of the signal output from the oscillating circuit 81, and outputs the L level signal (i.e., the signal (c)) after a lapse of sufficient time. When the signal (c) becomes the L level, the switch control circuit 87 outputs the L level signal (i.e., the signal (d)). However, when detecting that the second storage means 3 has a sufficient voltage, the cell voltage detecting means 85 outputs the H level signal. Therefore, the OR circuit 92 outputs the H level signal, and the N-channel transistor 71 of the switch 7 is turned on. As described above, when the OR circuit 92 is provided in place of the switch 9 shown in FIG. 3, the rechargeable electronic timepiece can operate in a similar manner to that of the rechargeable electronic timepiece shown in FIG. 3. Needless to mention, the present modified system can be also employed at the time of disassembling the clock at a retail shop or the like.

Figure 5:
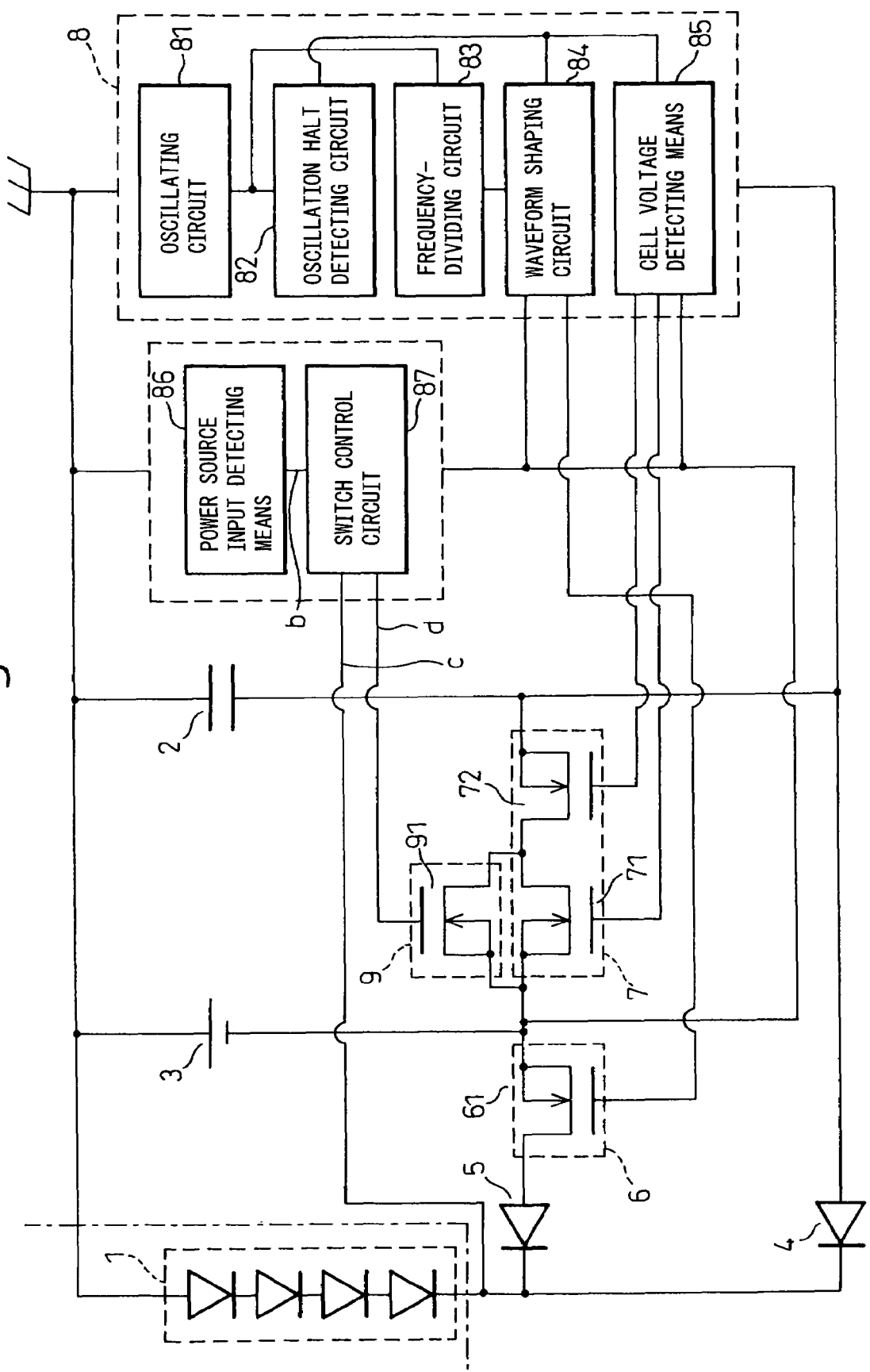
FIG. 5 is a block configuration diagram of a rechargeable electronic timepiece according to a third embodiment of the present invention.

FIG. 5 is a block configuration diagram of a rechargeable electronic timepiece according to a third embodiment of the present invention. The rechargeable electronic timepiece shown in FIG. 5 is different from that shown in FIG. 1 in that the switch control circuit 87 shown in FIG. 5 is controlled based on a signal of the power generating means 1.

According to the present embodiment, it is assumed that, at the beginning, the power generating means 1 is built in the electronic timepiece, but the second storage means 3 is not input to the electronic timepiece. Therefore, the second storage means 3 is input first.

When detecting that the second storage means 3 is input, the power source input detecting circuit 86 outputs the L level signal (i.e., the signal (b)). When the signal (b) becomes the L level, the switch control circuit 87 turns on the switch 9. The energy stored in the second storage means 3 is discharged to the first storage means 2 via the N-channel transistor 91 of the switch 9 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating.

When the voltage of the second storage means 3 is insufficient, the voltage of the first storage means 2 becomes lower than the minimum operating voltage of the oscillating circuit 81, and the oscillating circuit 81 does not start oscillating accordingly. However, according to the present embodiment, because the power generating means 1 is built in, the power generating means starts oscillating. In FIG. 5, the rechargeable electronic timepiece is configured such that the switch control circuit 87 detects the power generation potential of the power generating means 1, and turns off the switch 9. When the switch 9 is off, the first storage means 2 is separated from the second storage means 3, and the power generating means 1 charges the first storage means 2 using the power generating potential of the power generating means 1.

When the first storage means 2 is sufficiently charged, the oscillating circuit 81 starts oscillating, and the clock circuit 8 starts operating. In this case, because the second storage means 3 does not have a sufficient charge amount, the cell voltage detecting means 85 keeps the switch 7 in the off state. Therefore, as explained with reference to FIG. 15, the first storage means 2 and the second storage means 3 are charged alternately. After the second storage means 3 is sufficiently charged, a state similar to that explained with reference to FIG. 15 is obtained. As explained above, even when the second storage means 3 has insufficient stored energy and also when the second storage means 3 has insufficient voltage, the oscillating circuit 81 can start normal oscillation based on the built-in power generating means 1. The present embodiment is particularly effective at the time of disassembling and cleaning the electronic timepiece.

Figure 6:
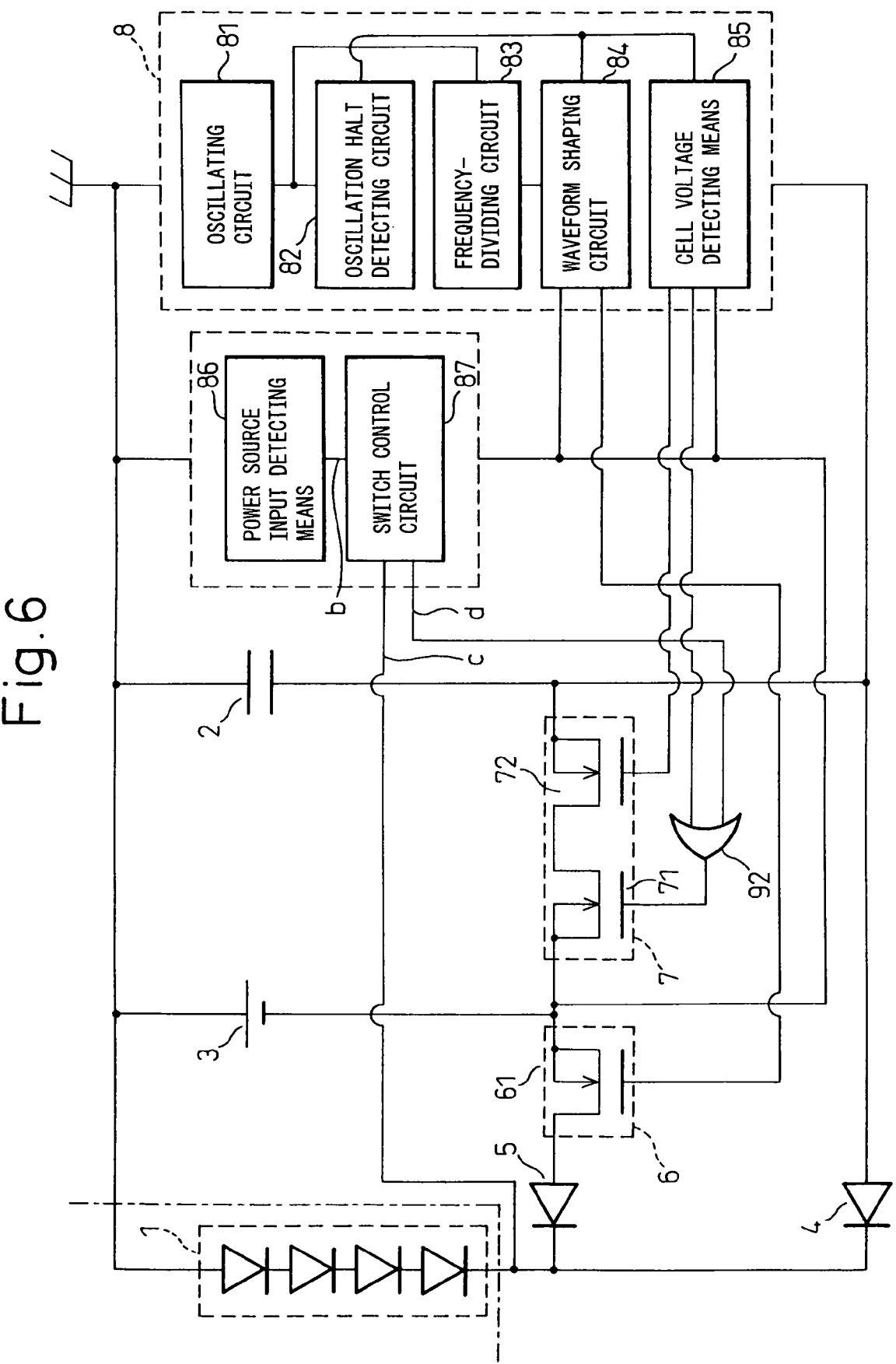
FIG. 6 is a block configuration diagram showing a modification of the rechargeable electronic timepiece according to the third embodiment.

FIG. 6 is a block configuration diagram showing a modification of the rechargeable electronic timepiece according to the third embodiment. The rechargeable electronic timepiece shown in FIG. 6 is different from that shown in FIG. 5 in that the OR circuit 92 is provided in place of the switch 9 shown in FIG. 5. One input of the OR circuit 92 is connected to the switch control circuit 87, and the other input of the OR circuit 92 is connected to the cell voltage detecting means 85. The output of the OR circuit 92 is connected to the gate of the N-channel transistor 71 of the switch 7.

In FIG. 6, as in the third embodiment, when detecting that the second storage means 3 is input, the power source input detecting circuit 86 outputs the L level signal (i.e., the signal (b)). When the signal (b) becomes the L level, the switch control circuit 87 outputs the H level signal (i.e., the signal (d)). As a result, the OR circuit 92 outputs the H level signal, and the N-channel transistor 71 of the switch 7 is turned on. Then, the energy stored in the second storage means 3 is discharged to the first storage means 2 via the N-channel transistor 71 of the switch 7 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating.

When the voltage of the second storage means 3 is insufficient, the voltage of the first storage means 2 becomes lower than the minimum operating voltage of the oscillating circuit 81, and the oscillating circuit 81 does not start oscillating accordingly. However, according to the present embodiment, because the power generating means 1 is built in, the power generating means starts oscillating. As in the third embodiment, the switch control circuit 87 detects the power generation potential of the power generating means 1, and outputs the L level signal. As a result, the OR circuit 92 outputs the L level signal, and turns off the N-channel transistor 71 of the switch 7. When the switch 7 is off, the first storage means 2 is separated from the second storage means 3, and the power generating means 1 charges the first storage means 2 using the power generating potential of the power generating means 1.

When the first storage means 2 is sufficiently charged, the oscillating circuit 81 starts oscillating, and the clock circuit 8 starts operating. In this case, because the second storage means 3 does not have a sufficient charge amount, the cell voltage detecting means 85 outputs the L level signal. Therefore, the OR circuit 92 keeps outputting the L level signal, and the switch 7 remains in the off state. As a result, as explained with reference to FIG. 14, the first storage means 2 and the second storage means 3 are charged alternately. After the second storage means 3 is sufficiently charged, a state similar to that explained with reference to FIG. 14 is obtained. As explained above, because the power generating means 1 is built in, even when the second storage means 3 has insufficient stored energy and also when the second storage means 3 has insufficient voltage, the power generating means 1 can charge the first storage means 2 without charging the second storage means 3 even if the charge of the second storage means 3 is not sufficient. Consequently, the clock circuit 8 can be started quickly. As shown in FIG. 6, when the OR circuit 92 is provided in place of the switch 9 shown in FIG. 5, the rechargeable electronic timepiece can operate in a similar manner to that of the rechargeable electronic timepiece shown in FIG. 5. Needless to mention, the present modified system can be also employed at the time of disassembling the clock at a retail shop or the like.

Figure 7:
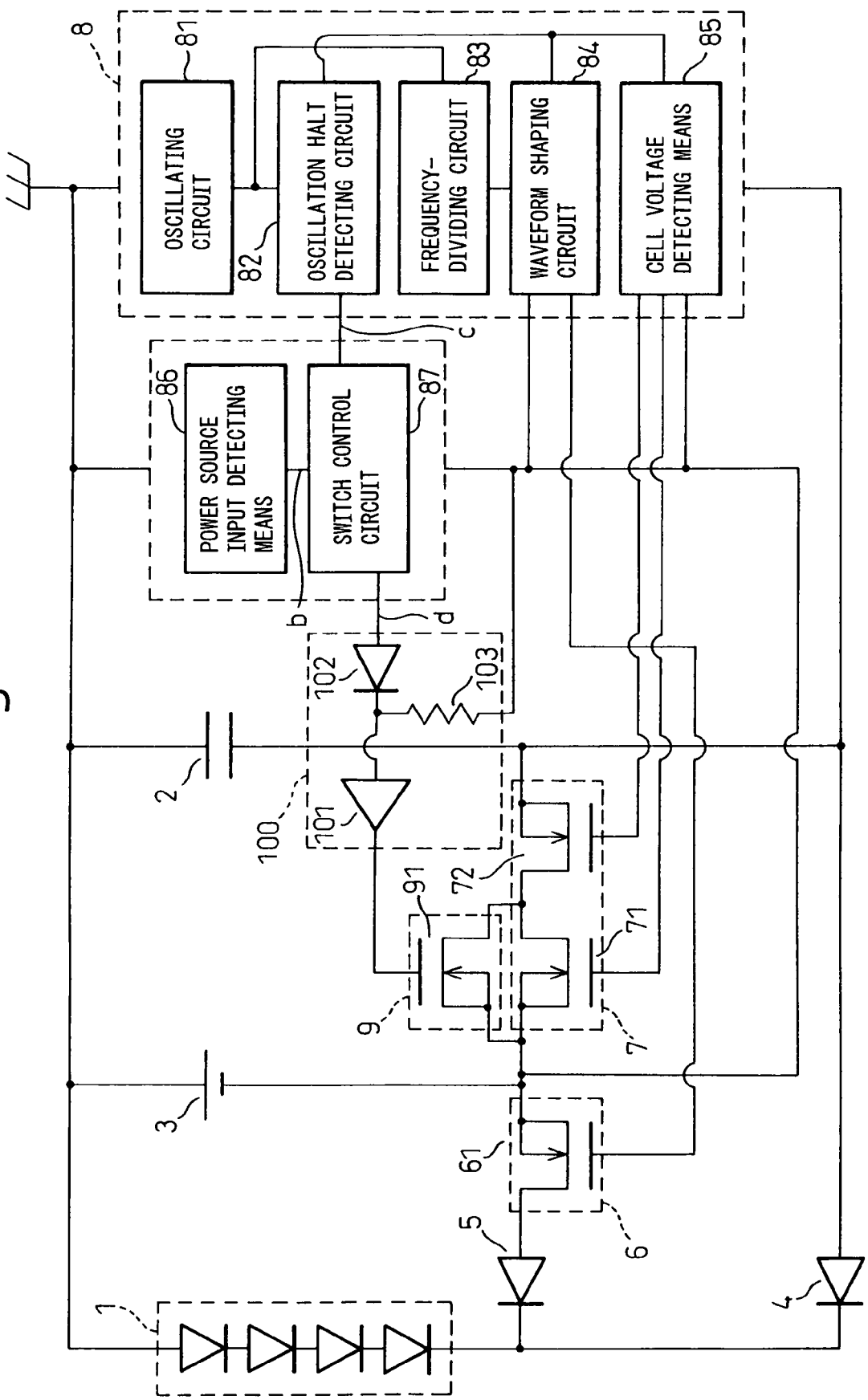
FIG. 7 is a block configuration diagram of a rechargeable electronic timepiece according to a fourth embodiment of the present invention.

FIG. 7 is a block configuration diagram of a rechargeable electronic timepiece according to a fourth embodiment of the present invention. In FIG. 7, constituent elements similar to those shown in FIG. 1 are assigned with identical reference numerals, and their explanation is omitted. The rechargeable electronic timepiece shown in FIG. 7 is different from that shown in FIG. 1 in that a comparator circuit 100 is provided in FIG. 7.

In FIG. 7, the comparator circuit 100 consists of a buffer gate 101, a diode 102, and a pull-down resistor 103. The diode 102 is configured such that its VF is larger than the operation starting voltage of the oscillating circuit 81. An anode of the diode 102 is connected to the output of the switch control circuit 87, and a cathode of the diode 102 is connected to the input of the buffer gate 101. The input of the buffer gate 101 is pulled down to the minus side of the second storage means 3 by the pull-down resistor 103. An output of the buffer gate 101 is connected to the gate of the N-channel transistor 91 of the switch 9.

The operation of the rechargeable electronic timepiece shown in the block configuration diagram of FIG. 7 is explained next. According to the present embodiment, it is assumed that the power generating means 1 is built in the electronic timepiece, but the second storage means 3 is not input to the electronic timepiece in advance. Like in the above embodiments, when the clock circuit 8 is not operating, and when the switch 6, the switch 7, and the switch 9 are in the off state, the second storage means 3 is input.

As in the first embodiment, when detecting that the second storage means 3 is input, the power source input detecting circuit 86 outputs the L level signal (i.e., the signal (b)). As a result, the switch control circuit 87 outputs the H level signal (i.e., the signal (d)).

When a difference (that is, the power source voltage of the second storage means 3) between the H level of the output (i.e., the signal (d)) of the switch control circuit 87 and a potential at the minus side of the second storage means 3 does not exceed the VF of the diode 102 due to the diode 102 connected between the switch control circuit 87 and the switch 9, the output of the diode 102 becomes in the release state. In this case, the input of the buffer gate 101 is fixed to the L level by the pull-down resistor 103, the output of the buffer gate 101 is at the L level, and the switch 9 remains in the off state. On the other hand, when the power source voltage of the second storage means 3 exceeds the VF of the diode 102, the output of the diode 102 becomes the H level, the output of the buffer gate 101 also becomes the H level, and the switch 9 is turned on.

When the switch 9 is turned on, the energy stored in the second storage means 3 is discharged to the first storage means 2 via the switch 9 and the parasitic diode of the N-channel transistor 72 of the switch 7, as described above. The voltage of the first storage means 2 rises due to the charging, and exceeds the minimum operating voltage of the oscillating circuit 81. Then, the oscillating circuit 81 starts oscillating, and the clock circuit 8 starts operating.

The switch 9 is turned on only when the voltage of the second storage means 3 exceeds the operation starting voltage of the oscillating circuit 81. Therefore, when the switch 9 is turned on, the oscillating circuit 81 can oscillate without fail. Accordingly, the switch 9 is not turned on when the voltage of the second storage means 3 is not sufficient to oscillate the oscillating circuit 81 even though the second storage means 3 is connected.

In this case, when the connected power generating means 1 is generating power, the power generating means 1 can store energy into the first storage means 2. As described above, when the voltage of the second storage means 3 is insufficient, the switch 9 is not turned on. Further, the cell voltage detecting means 85 does not turn on the switch 7. Accordingly, the energy stored in the first storage means 2 is not charged to the second storage means 3, thereby quickly charging the first storage means 2. When the first storage means 2 is sufficiently charged, the oscillating circuit 81 can start oscillating, thereby operating the clock circuit 8.

Figure 8:
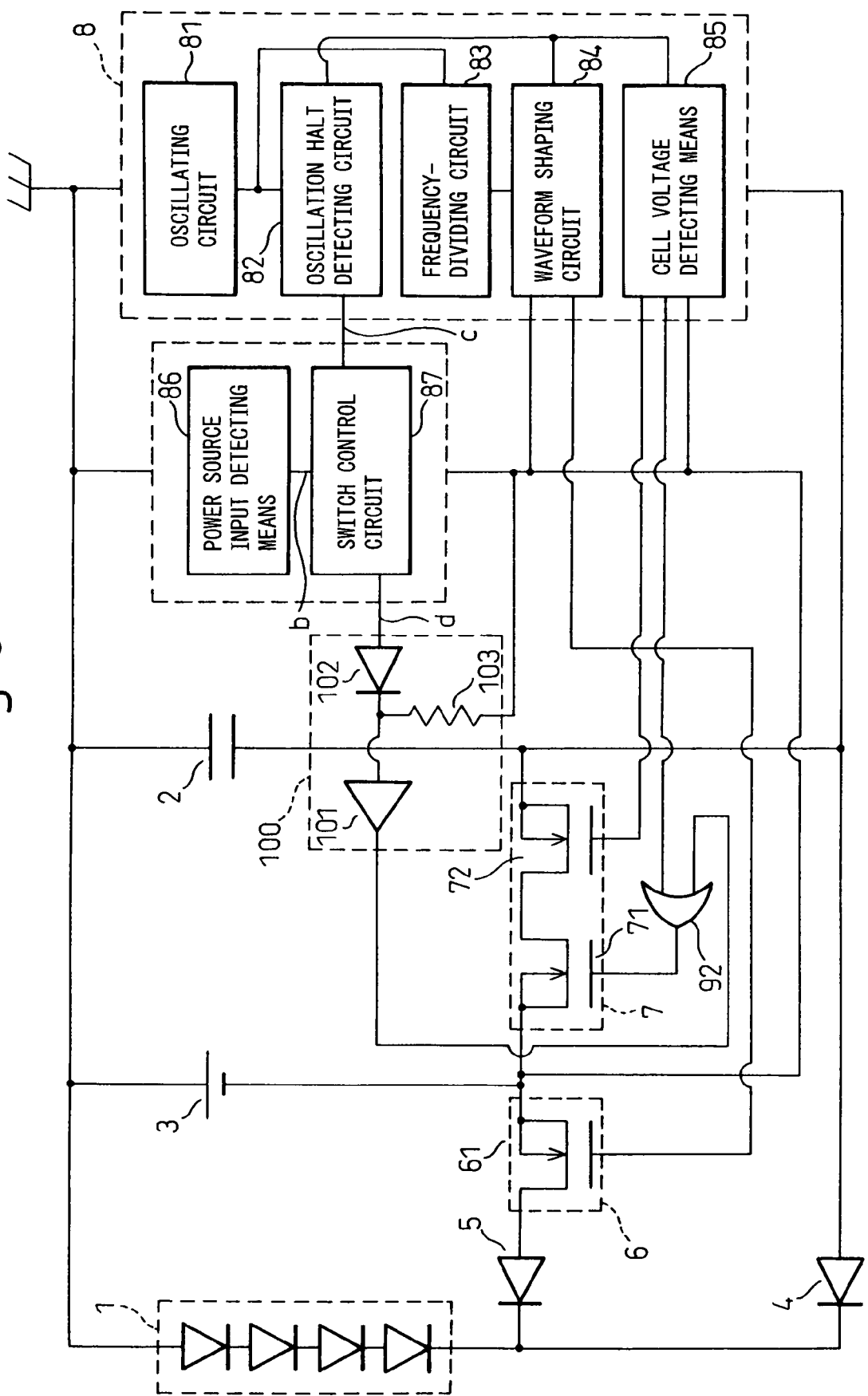
FIG. 8 is a block configuration diagram showing a modification of the rechargeable electronic timepiece according to the fourth embodiment.

FIG. 8 is a block configuration diagram showing a modification of the rechargeable electronic clock according to the fourth embodiment. The rechargeable electronic timepiece shown in FIG. 8 is different from that shown in FIG. 7 in that the OR circuit 92 is provided in place of the switch 9 shown in FIG. 7. One input of the OR circuit 92 is connected to the output of the buffer gate 101 of the comparator circuit 100, and the other input of the OR circuit 92 is connected to the cell voltage detecting means 85. The output of the OR circuit 92 is connected to the gate of the N-channel transistor 71 of the switch 7.

In FIG. 8, as in the fourth embodiment, when detecting that the second storage means 3 is input, the power source input detecting circuit 86 outputs the L level signal (i.e., the signal (b)). When the signal (b) becomes the L level, the switch control circuit 87 outputs the H level signal (i.e., the signal (d)).

As described above, the comparator circuit 100 outputs the L level signal when the power source voltage of the second storage means 3 does not exceed the VF of the diode 102.

When the power source voltage of the second storage means 3 exceeds the VF of the diode 102, the comparator circuit 100 outputs the H level signal.

When the comparator circuit 100 outputs the H level signal, the OR circuit 92 outputs the H level signal, and turns on the N-channel transistor 71 of the switch 7. Then, the energy stored in the second storage means 3 is discharged to the first storage means 2 via the transistor 71 of the switch 7 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating and the clock circuit 8 starts operating.

The N-channel transistor 71 of the switch 7 is turned on only when the voltage of the second storage means 3 exceeds the operation starting voltage of the oscillating circuit 81. Therefore, when the N-channel transistor 71 of the switch 7 is turned on, the oscillating circuit 81 can oscillate without fail. Accordingly, the N-channel transistor 71 of the switch 7 is not turned on, when the voltage of the second storage means 3 is not sufficient to oscillate the oscillating circuit 81 although the second storage means 3 is connected. In this case, it is necessary to connect the power generating means 1 to generate power, and store the generated energy into the first storage means 2. As described above, when the first storage means 2 is sufficiently charged, the oscillating circuit 81 can start oscillating, thereby operating the clock circuit 8.

As described above, when the OR circuit 92 is provided in place of the switch 9 shown in FIG. 7, the rechargeable electronic timepiece can operate in a similar manner to that of the rechargeable electronic timepiece shown in FIG. 7. Needless to mention, the present modified system can be also employed at the time of disassembling the clock at a retail shop or the like.

Figure 11:
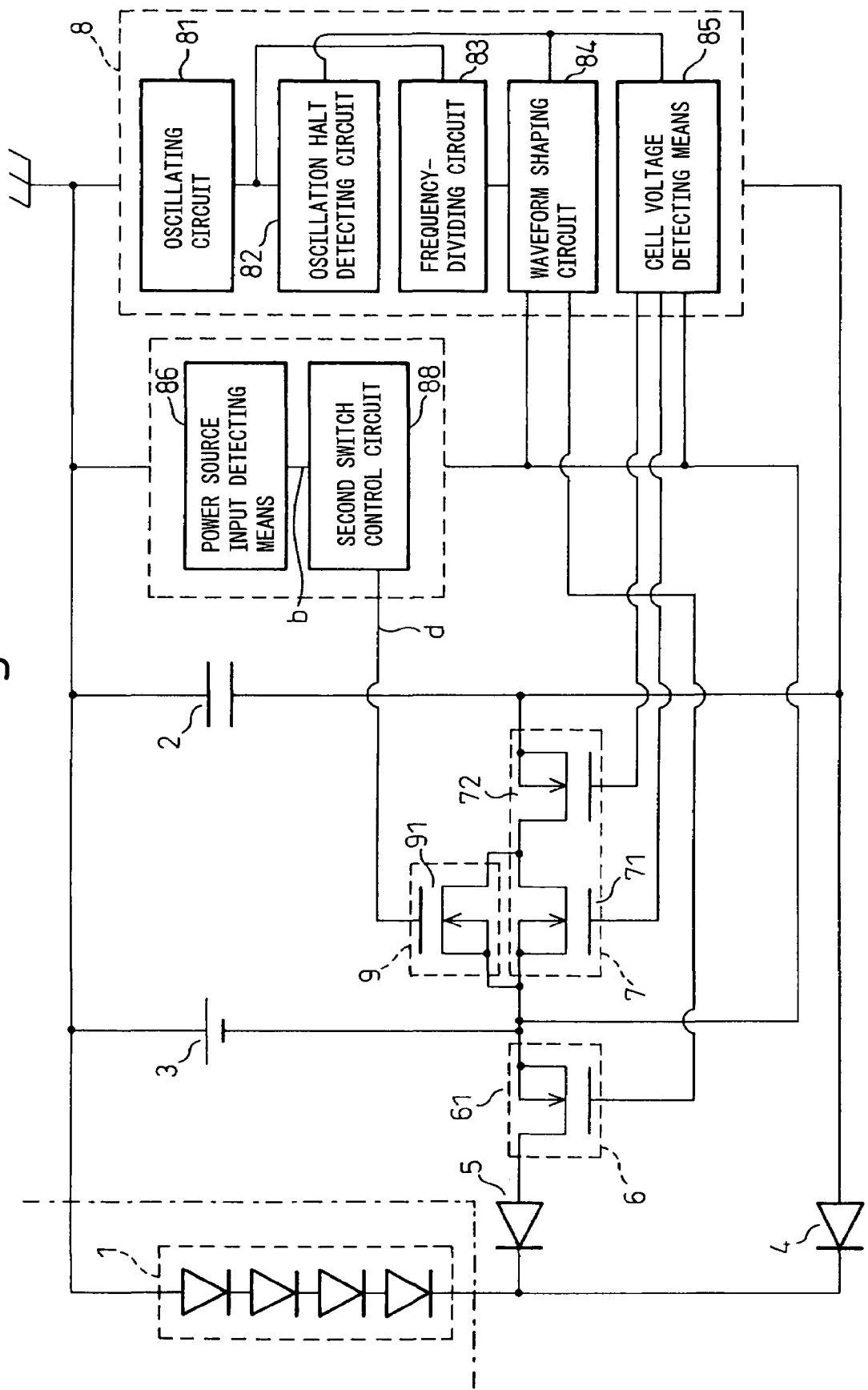
FIG. 11 is a block configuration diagram of a rechargeable electronic timepiece according to a fifth embodiment of the present invention.

FIG. 11 is a block configuration diagram of a rechargeable electronic timepiece according to a fifth embodiment of the present invention. In FIG. 11, constituent elements similar to those shown in FIG. 1 are assigned with identical reference numerals, and their explanation is omitted. The rechargeable electronic timepiece shown in FIG. 11 is different from that shown in FIG. 1 in that a second switch control circuit 88 is used in FIG. 11.

Figure 13:
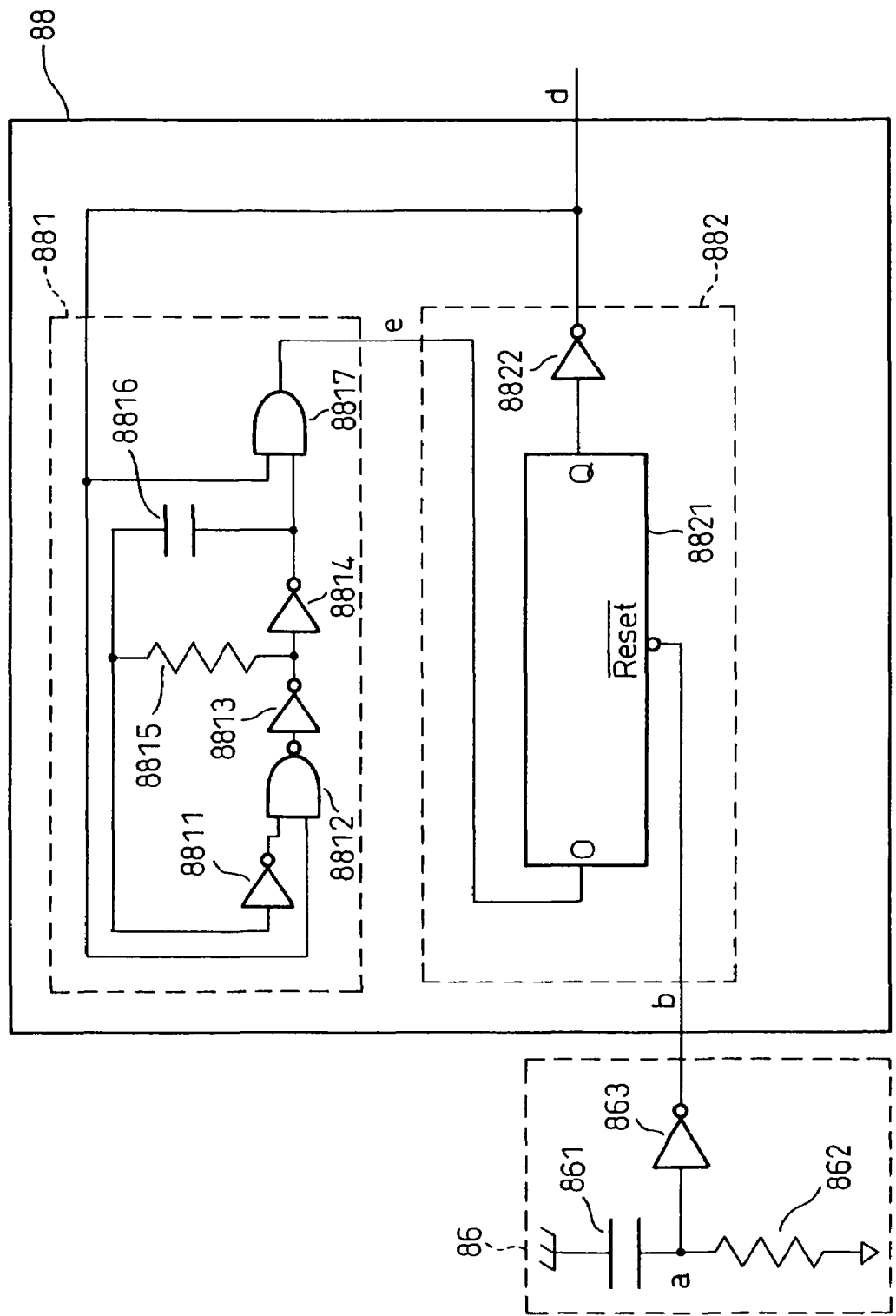
FIG. 13 is a configuration diagram of power source input detecting means and a second switch control circuit according to the present invention.

FIG. 13 shows one example of a circuit configuration of the power source input detecting means 86 and the second switch control circuit 88. As in FIG. 9, the power source input detecting means 86 includes the capacitor 861, the resistor 862, and the inverter 863. One electrode of the capacitor 861 is set to the VDD potential, and the other electrode of the capacitor 861 is connected to the resistor 862. One terminal of the resistor 862 is set to the VSS potential, and the other terminal of the resistor 862 is set to the capacitor 861. The line that connects between the capacitor 861 and the resistor 862 is connected to the input (i.e., the signal (a)) of the inverter 863, and the output of the inverter 863 becomes the output (i.e., the signal (b)) of the power source input detecting means 86.

The second switch control circuit 88 consists of a CR oscillator 881, and a counter 882. The CR oscillator 881 includes inverters 8811, 8813, and 8814, a NAND gate 8812, a NAND gate 8717, a resistor 8815, and a capacitor 8816. The counter 882 includes a timer 8821, and an inverter 8822.

The CR oscillator 881 starts oscillating when the input signal (i.e., the signal (d)) becomes the H level. A frequency of the output (i.e., a signal (e)) is changed according to a time constant determined by the resistor 8815 and the capacitor 8816. The counter 882 as one example of clock means counts the output (i.e., the signal (e)) of the CR oscillator. When the counter 882 counts up (N times), the counter outputs the L level signal (i.e., the signal (d)).

The operation of the circuit shown in FIG. 13 is explained next. The potential of the signal (a) of the power source input detecting means 86 shifts as shown by (a) in FIG. 10. Therefore, when the second storage means 3 is input, the output (i.e., the signal (b)) of the power source input detecting means 86 is at the L level. The timer 8821 of the counter 882 is reset by the signal (b), and the output signal of the timer 8821 becomes the L level. The inverter 8822 changes the output (i.e., the signal (d)) of the counter 882 to the H level. When the signal (d) becomes the H level, the CR oscillator 881 starts oscillating. The counter 882 counts the output (i.e., the signal (e)) of the CR oscillator 881. When the count reaches a predetermined count number (N), the counter 882 outputs the L level (i.e., the signal (d)). When the signal (d) becomes the L level, the CR oscillator 881 stops oscillating.

It is desirable that the time taken for the output of the second switch control circuit 88, or the output (i.e., the signal (d)) of the counter 882, to reach from the H level to the L level after the second storage means 3 is input, is larger than the time taken for the first storage means 2 to be charged by the second storage means 3 until the oscillation of the oscillating circuit 81 is stabilized. It is also desirable that the time taken for the output of the second switch control circuit 88 to reach from the H level to the L level is the time taken for the cell voltage detecting means 85 to start operating. The time taken for the output of the second switch control circuit 88 to reach from the H level to the L level can be changed by changing the time constant of the CR oscillator 882 or by changing the count-up number (N) of the counter 882.

The operation of the rechargeable electronic timepiece shown in the block configuration diagram of FIG. 11 is explained next. According to the present embodiment, it is assumed that the power generating means 1 is built into the electronic timepiece, but the second storage means 3 is not input to the electronic timepiece in advance. As in the above embodiments, when the clock circuit 8 is not operating, and when the switch 6, the switch 7, and the switch 9 are in the off state, the second storage means 3 is input.

As in the first embodiment, when detecting that the second storage means 3 is input, the power source input detecting circuit 86 outputs the L level signal (i.e., the signal (b)). When the signal (b) becomes the L level, the second switch control circuit 88 outputs the H level signal (i.e., the signal (d)).

When the second switch control circuit 88 outputs the H level signal (i.e., the signal (d)), the switch 9 is turned on. When the connected second storage means 3 is sufficiently charged and has sufficient voltage in advance, the energy stored in the second storage means 3 is charged to the first storage means 2 via the switch 9 in the on state and the parasitic diode of the forward N-channel transistor 72 of the switch 7. The voltage of the first storage means 2 rises due to the charging, and exceeds the minimum operating voltage of the oscillating circuit 81. Then, the oscillating circuit 81 starts oscillating, and the clock circuit 8 starts operating.

As described above, the second switch control circuit 88 outputs the L level (i.e., the signal (d)), after a lapse of time determined in advance based on the time constant of the CR oscillator 881 and the count up number (N) of the counter 882. As a result, the switch 9 is turned off. At the same time, when detecting that there is sufficient voltage of the second storage means 3, the cell voltage detecting means 85 outputs the H level signal, and turns on the switch 7. As explained above, when the second storage means 3 is input in the state that the operation of the clock circuit 8 is halted, the clock circuit 8 can quickly start operation. Therefore, the power consumption of the clock circuit 8 can be tested easily. Needless to mention, the present system can be also employed at the time of disassembling the clock at a retail shop or the like.

In this case, the operation of the second switch control circuit 88 does not depend on whether the oscillating circuit 81 is oscillating or not. Therefore, after the second storage 3 is input, even when the voltage of the second storage means 3 is low and when the oscillating circuit 81 does not start oscillating, the output (i.e., the signal (d)) of the second switch control circuit 88 becomes the L level, and turns off the switch 9. Accordingly, when the power generating means (i.e., the solar panel) 1 starts generating power upon the incidence of light onto the power generating means, the first storage means 2 is charged to enable the oscillating circuit 81 to start oscillating.

Figure 12:
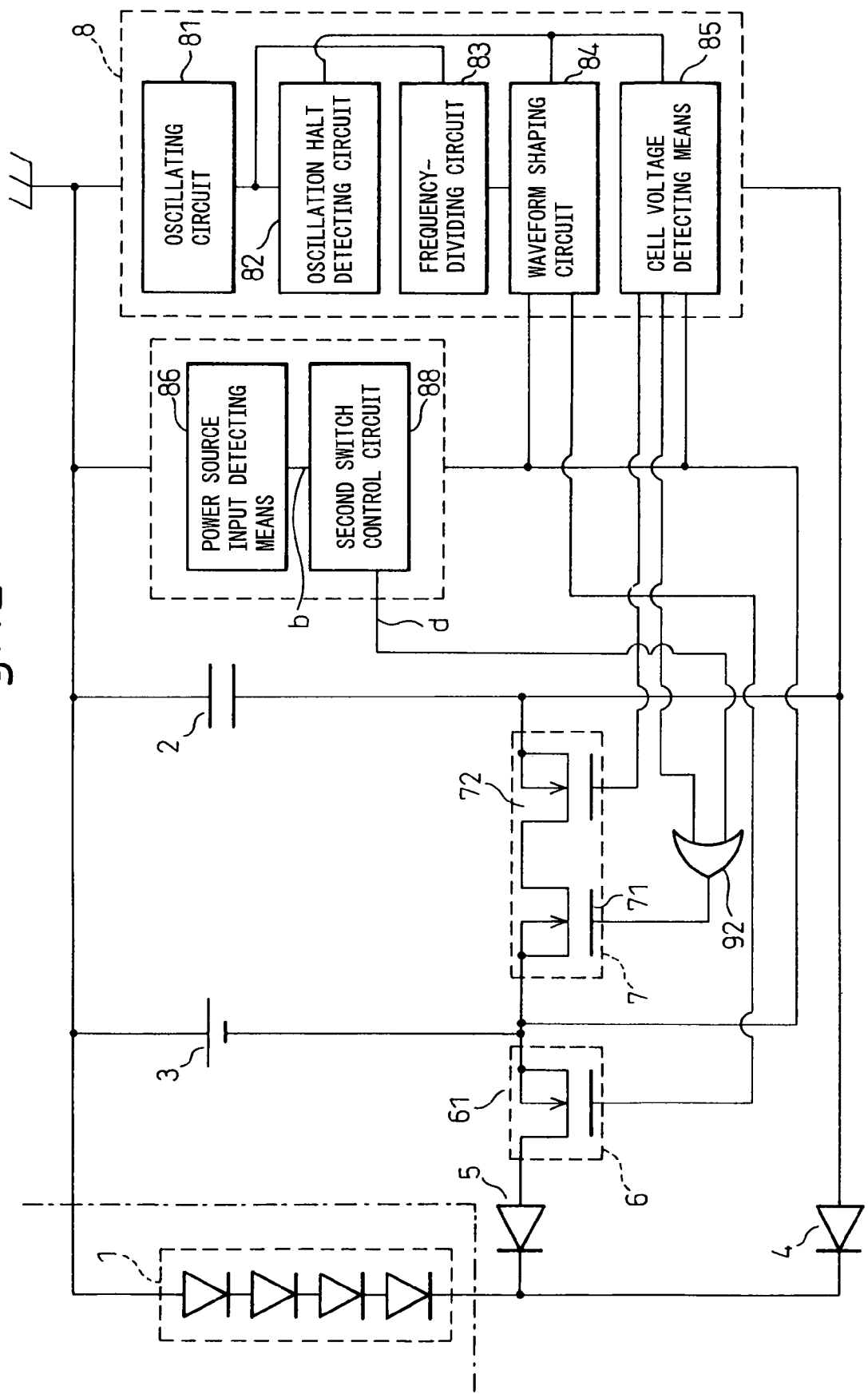
FIG. 12 is a block configuration diagram showing a modification of the rechargeable electronic timepiece according to the fifth embodiment.

FIG. 12 is a block configuration diagram showing a modification of the rechargeable electronic timepiece according to the fifth embodiment. The rechargeable electronic timepiece shown in FIG. 12 is different from that shown in FIG. 11 in that the OR circuit 92 is provided in place of the switch 9 shown in FIG. 11. One input of the OR circuit 92 is connected to the second switch control circuit 88, and the other input of the OR circuit 92 is connected to the cell voltage detecting means 85. The output of the OR circuit 92 is connected to the gate of the N-channel transistor 71 of the switch 7.

In FIG. 12, as in the fifth embodiment, when detecting that the second storage means 3 is input, the power source input detecting circuit 86 outputs the L level signal (i.e., the signal (b)). When the signal (b) becomes the L level, the second switch control circuit 88 outputs the H level signal (i.e., the signal (d)). The OR circuit 92 outputs the H level signal, and the N-channel transistor 71 of the switch 7 is turned on. Then, the energy stored in the second storage means 3 is discharged to the first storage means 2 via the N-channel transistor 71 of the switch 7 and the parasitic diode of the N-channel transistor 72 of the switch 7. The voltage of the first storage means 2 rises due to the charging, and exceeds the minimum operating voltage of the oscillating circuit 81. Then, the oscillating circuit 81 starts oscillating. As described above, when the OR circuit 92 is provided in place of the switch 9 shown in FIG. 11, the rechargeable electronic timepiece can operate in a similar manner to that of the rechargeable electronic timepiece shown in FIG. 11. Needless to mention, the present modified system can be also employed at the time of disassembling the clock at a retail shop or the like.

What is claimed is:

1. An electronic timepiece comprising:
   a first power source;
   a clock circuit connected to the first power source;
   a power source input detecting circuit;
   a switch circuit for connecting the first power source and a second power source whose capacity is larger than a capacity of the first source, wherein the switch circuit is in an off state during a halted state of the clock circuit; and
   a control circuit for, in response to the power source input detecting circuit detecting the insertion of the second power source during a halted state of the clock circuit, controlling the switch circuit to turn on in order to connect the first power source and the second power source so that the first power source is charged by the second power source, thereby operating the clock circuit.

2. The electronic timepiece according to claim 1, wherein the switch circuit has a first switch that connects the first power source and the second power source in parallel, and a second switch that is connected in parallel to the first switch, and when the power source input detecting circuit detects the input of the second power source, the control circuit turns on the second switch to connect the first power source and the second power source.

3. The electronic timepiece according to claim 2, further comprising:
a power generator;
and a voltage detector for turning on the first switch when the power generator sufficiently charges the second power source.

4. The electronic timepiece according to claim 2, wherein the control circuit is controlled by the clock circuit to turn off the second switch when a predetermined condition is detected after the second switch was turned on.

5. The electronic timepiece according to claim 4, wherein the clock circuit has an oscillating circuit, and
the predetermined condition is that the oscillating circuit starts oscillating.

6. The electronic timepiece according to claim 4, wherein the predetermined condition is a lapse of a predetermined time after the second switch was turned on.

7. The electronic timepiece according to claim 4, wherein the control circuit includes clocking means, and the predetermined condition is that the clocking means runs for a predetermined time.

8. The electronic timepiece according to claim 4, wherein the predetermined condition is a lapse of a constant time after the oscillating circuit starts oscillating after the second switch was turned on.

9. The electronic timepiece according to claim 4, further comprising a power generator, wherein
the predetermined condition is that the power generator means generates power.

10. The electronic timepiece according to claim 2, further comprising a comparator circuit that operates so as not to turn on the second switch when the voltage of the second power source is at or below a predetermined voltage.

11. The electronic timepiece according to claim 1, wherein the switch circuit has a first switch that connects the first power source in parallel to the second power source and, when the power source input detecting circuit detects that the second power source is input, the control circuit turns on the first switch to connect the first power source and the second power source.

12. The electronic timepiece according to claim 11, further comprising:
a power generator; and
a voltage detector for turning on the first switch when the power generator sufficiently charges the second power source.

13. The electronic timepiece according to claim 11, wherein
the control circuit is controlled by the clock circuit to keen the first switch in the ON state until a predetermined condition is detected after the first switch was turned on.

14. The electronic timepiece according to claim 13, wherein
the clock circuit has an oscillating circuit, and
the predetermined condition is that the oscillating circuit starts oscillating.

15. The electronic timepiece according to claim 13, wherein
the predetermine condition is a lapse of a predetermined time has passed after the first switch was turned on.

16. The electronic timepiece according to claim 13, wherein
the control circuit includes clocking means, and the predetermined condition is that the clocking means runs for a predetermined time.

17. The electronic timepiece according to claim 13, wherein
the predetermined condition is a lapse of a constant time has passed after the oscillating circuit starts oscillating after the first switch was turned on.

18. The electronic timepiece according to claim 13, further comprising a power generator, wherein
the predetermined condition is that the power generator generates power after the first switch was turned on.

19. The electronic timepiece according to claim 11, further comprising a comparator circuit that operates so as not to turn on the first switch when the voltage of the second power source is at or below a predetermined voltage.

* * * * *